US012440556B2

(12) United States Patent
Ameiss et al.

(10) Patent No.: US 12,440,556 B2
(45) Date of Patent: Oct. 14, 2025

(54) GENETICALLY MODIFIED CELL LINE FOR PRODUCTION OF MAREK'S DISEASE VIRUS VACCINE AND METHODS OF MAKING AND USING THE SAME

(71) Applicant: Zoetis Services LLC, Parsippany, NJ (US)

(72) Inventors: Keith Allen Ameiss, Kalamazoo, MI (US); Everett Lee Rosey, Schoolcraft, MI (US)

(73) Assignee: Zoetis Services LLC, Parsippany, NJ (US)

(*) Notice: Subject to any disclaimer, the term of this patent is extended or adjusted under 35 U.S.C. 154(b) by 833 days.

(21) Appl. No.: 17/347,075

(22) Filed: Jun. 14, 2021

(65) Prior Publication Data

US 2021/0386854 A1    Dec. 16, 2021

Related U.S. Application Data

(60) Provisional application No. 63/039,021, filed on Jun. 15, 2020.

(51) Int. Cl.
| | |
|---|---|
| *C12N 5/071* | (2010.01) |
| *A61K 39/255* | (2006.01) |
| *C12N 5/10* | (2006.01) |
| *C12N 7/00* | (2006.01) |
| *C12N 9/22* | (2006.01) |
| *C12N 15/11* | (2006.01) |

(52) U.S. Cl.
CPC .......... *A61K 39/255* (2013.01); *C12N 5/0602* (2013.01); *C12N 5/10* (2013.01); *C12N 7/00* (2013.01); *C12N 9/22* (2013.01); *C12N 15/111* (2013.01); *C12N 2310/20* (2017.05); *C12N 2710/16034* (2013.01)

(58) Field of Classification Search
CPC ...... A61K 39/255; C12N 5/0602; C12N 5/10; C12N 7/00; C12N 9/22; C12N 15/111; C12N 2310/20; C12N 2710/16034; C12N 2710/16334; C12N 2710/16351; C12N 15/86

See application file for complete search history.

(56) References Cited

U.S. PATENT DOCUMENTS

| | | | |
|---|---|---|---|
| 5,350,576 A | 9/1994 | Payne et al. | |
| 6,194,167 B1 | 2/2001 | Browse et al. | |
| 6,774,107 B1 | 8/2004 | Strittmatter et al. | |
| 6,790,639 B2 | 9/2004 | Brown et al. | |
| 10,428,316 B2 * | 10/2019 | Kool | C12N 15/79 |
| 2005/0084503 A1 | 4/2005 | Osterrieder et al. | |

FOREIGN PATENT DOCUMENTS

| | | |
|---|---|---|
| WO | 2018093903 A1 | 5/2018 |
| WO | 2018112051 A1 | 6/2018 |

OTHER PUBLICATIONS

Hernández. (2014). Poultry and Avian Diseases. Encyclopedia of Agriculture and Food Systems, vol. 4, 504-520. (Year: 2014).*
Jordan et al (2009). An avian cell line designed for production of highly attenuated viruses. Vaccine 27 (2009) 748-756. (Year: 2009).*
Altschul, et al., Nucleic Acids Research, vol. 25, pp. 3389-3402.
Altschul S.F., et al., "Basic Local Alignment Search Tool," Journal of Molecular Biology, 1990, vol. 215, pp. 403-410(8 Pages).
Baigent S.J., et al., "Absolute Quantitation of Marek's Disease Virus Genome Copy Number in Chicken Feather and Lymphocyte Samples Using Real-Time PCR," Journal of Virology Methods, 2005, vol. 123, No. 1, pp. 53-64, DOI: 10.1016/j.jviromet.2004.08.019, XP004670514.
Farzaneh M., et al., "Avian Embryos and Related Cell Lines: A Convenient Platform for Recombinant Proteins and Vaccine Production", Biotechnology Journal, Mar. 29, 2017, vol. 12, No. 5, 1600598, pp. 1-10, DOI: 10.1002/biot.201600598.
Geerligs H., et al., "Efficacy and Safety of Cell-Associated Vaccines Against Marek's Disease Virus Grown in a Continuous Cell Line from Chickens," Vaccine, 2008, vol. 26, No. 44, pp. 5595-5600, DOI: 10.1016/j.vaccine.2008.07.080, XP025469577, 6 Pages.
Geerligs H., et al., "Efficacy and Safety of Cell-Associated Vaccines Against Marek's Disease Virus Grown in QT35 Cells or JBJ-1 Cells", Avian Diseases, Jun. 1, 2013, vol. 57, No. 2s1, pp. 448-453, Retrieved from http://dx.doi.org/10.1637/10344-090312-Reg. 1, DOI: 10.1637/10344-090312-Reg.1, ISSN: 0005-2086, XP055848650, 7 Pages.
Harayama., et al., "Detection of Genome-Edited Mutant Clones by a Simple Competition-Based PCR Method," PLo S One, 2017, vol. 12, No. 6, p. e0179165.
International Preliminary Report on Patentability for International Application No. PCT/US2021/037306, dated Dec. 29, 2022, 11 Pages.
International Search Report and Written Opinion for International Application No. PCT/US2021/037306, dated Dec. 10, 2021, 17 Pages.
Islam A., et al., "Differential Amplification and Quantitation of Marek's Disease Viruses Using Real-Time Polymerase Chain Reaction," Journal of Virology Methods, 2004, vol. 119, No. 2, pp. 103-113.
Kim T.H., et al., "Knockout of IRF7 Highlights its Modulator Function of Host Response Against Avian Influenza Virus and the Involvement of MAPK and TOR Signaling Pathways in Chicken", Genes, Apr. 2, 2020, vol. 11, No. 385, 19 Pages, DOI: 10.3390/genes11040385.

(Continued)

*Primary Examiner* — Janet L Andres
*Assistant Examiner* — Samadhan Jaising Jadhao
(74) *Attorney, Agent, or Firm* — Kanika Ghai

(57) ABSTRACT

The present application relates to an avian cell line capable of supporting viral growth of Marek's Disease Virus (MDV), including Herpes Virus of Turkeys (HVT), methods of producing such cell lines, and therapeutic uses of the cell lines and resulting vaccines.

23 Claims, 4 Drawing Sheets
Specification includes a Sequence Listing.

(56) References Cited

OTHER PUBLICATIONS

Naito Y., et al., "CRISPRdirect: Software for Designing CRISPR/Cas Guide RNA with Reduced Off-Target Sites," Bioinformatics, 2015, vol. 31, No. 7, pp. 1120-1123, DOI: 10.1093/bioinformatics/btu743, XP055186272.
Van Der Sanden S.M., et al., "Engineering Enhanced Vaccine Cell Lines To Eradicate Vaccine-Preventable Diseases: The Polio End Game," Journal of Virology, 2016, vol. 90, No. 4, pp. 1694-1704, DOI: 10.1128/JVI.01464-15, XP055569406.
Wu W., et al., "Development of Improved Vaccine Cell Lines Against Rotavirus," Scientific Data, 2017, vol. 4, Article 170021.

\* cited by examiner

SEQUENCE LISTING

<160> NUMBER OF SEQ ID NOS: 33

<210> SEQ ID NO 1
<211> LENGTH: 19
<212> TYPE: DNA

```
<213> ORGANISM: Artificial Sequence
<220> FEATURE:
<223> OTHER INFORMATION: SORF1 F1 qPCR primer

<400> SEQUENCE: 1
ggcagacacc gcgttgtat                                                19

<210> SEQ ID NO 2
<211> LENGTH: 21
<212> TYPE: DNA
<213> ORGANISM: Artificial Sequence
<220> FEATURE:
<223> OTHER INFORMATION: SORF1 R1 qPCR primer

<400> SEQUENCE: 2
tgtccacgct cgagactatc c                                             21

<210> SEQ ID NO 3
<211> LENGTH: 23
<212> TYPE: DNA
<213> ORGANISM: Artificial Sequence
<220> FEATURE:
<223> OTHER INFORMATION: SORF1 S1 qPCR primer

<400> SEQUENCE: 3
aacccgggct tgtggacgtc ttc                                           23

<210> SEQ ID NO 4
<211> LENGTH: 478
<212> TYPE: DNA
<213> ORGANISM: Artificial Sequence
<220> FEATURE:
<223> OTHER INFORMATION: SORF1 STD

<400> SEQUENCE: 4
aaaagcaaca gtactagtat tacgccggcc gccatggaag aaactaagag gctgtaaatg    60
acggtcgggc cttctttaaa agcgcttgta tgtgtagggg cggccgtgaa gttgcccggc   120
gtgtcggcag acaccgcgtt gtatccgaac ccgggcttgt gaacgtcttc aaacacgttc   180
aggatagtct cgagcgtgga cagataaacg tacgtccaag caagcggcct tccattatag   240
aggcctacga tcacgtacag tcccgcgtct gtcggttggg cattcgccaa cctgaacgag   300
ggaacgtccg attcgaggaa agccagcttc ccctggacgg attcgtctac ggacgtttgg   360
aatgtacacc cgcggacgtc cacgcggcag ccgtcggtac gcgccgacgc caactgcatg   420
acgtccatat ttgccgcaaa acgacattcg gcatgctcgg gtaccatttg gcattccg    478

<210> SEQ ID NO 5
<211> LENGTH: 19
<212> TYPE: DNA
<213> ORGANISM: Artificial Sequence
<220> FEATURE:
<223> OTHER INFORMATION: OVO (TF) F1   qPCR primer

<400> SEQUENCE: 5
cattgccact gggctctgt                                                19

<210> SEQ ID NO 6
<211> LENGTH: 21
<212> TYPE: DNA
<213> ORGANISM: Artificial Sequence
<220> FEATURE:
<223> OTHER INFORMATION: OVO (TF) R1   qPCR primer

<400> SEQUENCE: 6
```

```
gcaatggcaa taaacctcca a                                              21

<210> SEQ ID NO 7
<211> LENGTH: 27
<212> TYPE: DNA
<213> ORGANISM: Artificial Sequence
<220> FEATURE:
<223> OTHER INFORMATION: OVO (TF) S qPCR primer

<400> SEQUENCE: 7
agtctggaga agtctgtgca gcctcca                                        27

<210> SEQ ID NO 8
<211> LENGTH: 381
<212> TYPE: DNA
<213> ORGANISM: Artificial Sequence
<220> FEATURE:
<223> OTHER INFORMATION: OVO (TF) STD qPCR primer

<400> SEQUENCE: 8
ctggagtgag ggaagaacca tgagttgcat ctccaccaaa atacacaaat acacacacaa     60
aaaacccagc ctggggcagc atcgtaatgg atttattcct gctgaaggca ggagagacaa    120
gctgcacact gctctttgca atggcaataa acctccaagg atggcggctg cacagacttc    180
tccagactga cagagcccag tggcaatgct atagctatct ctataacgtg gcaccaacag    240
taacttttga atttaaatcc agcaggtttt ccttctccaa ggaagaatcc caaagaagaa    300
atggagccca cctcaatcac gtcttttagc aattaggatg ggttcgtcca gtaacacatc    360
cagtgggtca aatacgaaca g                                             381

<210> SEQ ID NO 9
<211> LENGTH: 42
<212> TYPE: RNA
<213> ORGANISM: Artificial Sequence
<220> FEATURE:
<223> OTHER INFORMATION: BLEC2 gRNA

<400> SEQUENCE: 9
gugggcucuu ccaguuccgu guuuuagagc uaugcuguuu ug                       42

<210> SEQ ID NO 10
<211> LENGTH: 42
<212> TYPE: RNA
<213> ORGANISM: Artificial Sequence
<220> FEATURE:
<223> OTHER INFORMATION: HTR2A gRNA

<400> SEQUENCE: 10
gauccaauga gauggcacag guuuuagagc uaugcuguuu ug                       42

<210> SEQ ID NO 11
<211> LENGTH: 42
<212> TYPE: RNA
<213> ORGANISM: Artificial Sequence
<220> FEATURE:
<223> OTHER INFORMATION: SLAMF8 gRNA

<400> SEQUENCE: 11
auggcauuca gggugcuggu guuuuagagc uaugcuguuu ug                       42

<210> SEQ ID NO 12
<211> LENGTH: 26
<212> TYPE: DNA
```

```
<213> ORGANISM: Artificial Sequence
<220> FEATURE:
<223> OTHER INFORMATION: HTR2A F-Out cbPCR primer

<400> SEQUENCE: 12
gcagcctggg agaaacaaaa caaaac                                          26

<210> SEQ ID NO 13
<211> LENGTH: 30
<212> TYPE: DNA
<213> ORGANISM: Artificial Sequence
<220> FEATURE:
<223> OTHER INFORMATION: HTR2A R-Out cbPCR primer

<400> SEQUENCE: 13
ctctaagcaa attaccctaa ggagaagctg                                      30

<210> SEQ ID NO 14
<211> LENGTH: 22
<212> TYPE: DNA
<213> ORGANISM: Artificial Sequence
<220> FEATURE:
<223> OTHER INFORMATION: HTR2A F-In cbPCR primer

<400> SEQUENCE: 14
cctccatcat gcacctctgt gc                                              22

<210> SEQ ID NO 15
<211> LENGTH: 22
<212> TYPE: DNA
<213> ORGANISM: Artificial Sequence
<220> FEATURE:
<223> OTHER INFORMATION: SLAMF8 F-Out cbPCR primer

<400> SEQUENCE: 15
tccacctgca cttccttctc ac                                              22

<210> SEQ ID NO 16
<211> LENGTH: 18
<212> TYPE: DNA
<213> ORGANISM: Artificial Sequence
<220> FEATURE:
<223> OTHER INFORMATION: SLAMF8 R-Out cbPCR primer

<400> SEQUENCE: 16
cacgcacacg gacactct                                                   18

<210> SEQ ID NO 17
<211> LENGTH: 19
<212> TYPE: DNA
<213> ORGANISM: Artificial Sequence
<220> FEATURE:
<223> OTHER INFORMATION: SLAMF8 F-In  cbPCR primer

<400> SEQUENCE: 17
cgtgaccatc cccaccagc                                                  19

<210> SEQ ID NO 18
<211> LENGTH: 22
<212> TYPE: DNA
<213> ORGANISM: Artificial Sequence
<220> FEATURE:
<223> OTHER INFORMATION: BLEC2 F-Out cbPCR primer

<400> SEQUENCE: 18
ggtgatgtcc ctgtgtccat ct                                              22
```

<210> SEQ ID NO 19
<211> LENGTH: 24
<212> TYPE: DNA
<213> ORGANISM: Artificial Sequence
<220> FEATURE:
<223> OTHER INFORMATION: BLEC2 R-Out

<400> SEQUENCE: 19
cagagctgct caatttggat tggc                                            24

<210> SEQ ID NO 20
<211> LENGTH: 20
<212> TYPE: DNA
<213> ORGANISM: Artificial Sequence
<220> FEATURE:
<223> OTHER INFORMATION: BLEC2 F-In cbPCR primer

<400> SEQUENCE: 20
tgtgggctct tccagttccg                                                 20

<210> SEQ ID NO 21
<211> LENGTH: 23
<212> TYPE: DNA
<213> ORGANISM: Artificial Sequence
<220> FEATURE:
<223> OTHER INFORMATION: BLEC2 R-In  cbPCR primer

<400> SEQUENCE: 21
gctttctgga agtcccacgg aac                                             23

<210> SEQ ID NO 22
<211> LENGTH: 42
<212> TYPE: RNA
<213> ORGANISM: Artificial Sequence
<220> FEATURE:
<223> OTHER INFORMATION: STAT4 gRNA

<400> SEQUENCE: 22
auguaaucca uuaccugcac guuuuagagc uaugcuguuu ug                        42

<210> SEQ ID NO 23
<211> LENGTH: 26
<212> TYPE: DNA
<213> ORGANISM: Artificial Sequence
<220> FEATURE:
<223> OTHER INFORMATION: STAT4 F-Out cbPCR primer

<400> SEQUENCE: 23
tctctgtcaa acaccagcaa ttctgc                                          26

<210> SEQ ID NO 24
<211> LENGTH: 27
<212> TYPE: DNA
<213> ORGANISM: Artificial Sequence
<220> FEATURE:
<223> OTHER INFORMATION: STAT4 R-Out  cbPCR primer

<400> SEQUENCE: 24
tgaagattag ctgtgacatc caagtca                                         27

<210> SEQ ID NO 25
<211> LENGTH: 39
<212> TYPE: DNA
<213> ORGANISM: Artificial Sequence
<220> FEATURE:

<223> OTHER INFORMATION: STAT4 R-In cbPCR primer

<400> SEQUENCE: 25
catggagtaa attagagaaa tgtaatccat tacctgcac                                   39

<210> SEQ ID NO 26
<211> LENGTH: 42
<212> TYPE: RNA
<213> ORGANISM: Artificial Sequence
<220> FEATURE:
<223> OTHER INFORMATION: CTSL2 gRNA

<400> SEQUENCE: 26
uaccuuugca guguauggau guuuuagagc uaugcuguuu ug                               42

<210> SEQ ID NO 27
<211> LENGTH: 27
<212> TYPE: DNA
<213> ORGANISM: Artificial Sequence
<220> FEATURE:
<223> OTHER INFORMATION: CTSL2 F-Out cbPCR primer

<400> SEQUENCE: 27
gcttttctca tgcttagact gatggca                                               27

<210> SEQ ID NO 28
<211> LENGTH: 38
<212> TYPE: DNA
<213> ORGANISM: Artificial Sequence
<220> FEATURE:
<223> OTHER INFORMATION: CTSL2 R-Out  cbPCR primer

<400> SEQUENCE: 28
cctgtttaac ttttggtaga tcattagagg aactttag                                   38

<210> SEQ ID NO 29
<211> LENGTH: 30
<212> TYPE: DNA
<213> ORGANISM: Artificial Sequence
<220> FEATURE:
<223> OTHER INFORMATION: CTSL2 F-In cbPCR primer

<400> SEQUENCE: 29
ggggaattga ttcagaggaa tcctatccat                                            30

<210> SEQ ID NO 30
<211> LENGTH: 42
<212> TYPE: RNA
<213> ORGANISM: Artificial Sequence
<220> FEATURE:
<223> OTHER INFORMATION: COBLL1 gRNA

<400> SEQUENCE: 30
aauggugcug gcuggcagga guuuuagagc uaugcuguuu ug                              42

<210> SEQ ID NO 31
<211> LENGTH: 22
<212> TYPE: DNA
<213> ORGANISM: Artificial Sequence
<220> FEATURE:
<223> OTHER INFORMATION: COBLL1 F-Out  cbPCR primer

<400> SEQUENCE: 31
gcagatgcag cgaagagttt ca                                                    22

```
<210> SEQ ID NO 32
<211> LENGTH: 32
<212> TYPE: DNA
<213> ORGANISM: Artificial Sequence
<220> FEATURE:
<223> OTHER INFORMATION: COBLL1 R-Out  cbPCR primer

<400> SEQUENCE: 32
cataccaaac cataaagaac acaaacactc tg                                     32

<210> SEQ ID NO 33
<211> LENGTH: 22
<212> TYPE: DNA
<213> ORGANISM: Artificial Sequence
<220> FEATURE:
<223> OTHER INFORMATION: COBLL1 F-In  cbPCR primer

<400> SEQUENCE: 33
actgccaagt tttccctcct gc                                                22
```

GENETICALLY MODIFIED CELL LINE FOR PRODUCTION OF MAREK'S DISEASE VIRUS VACCINE AND METHODS OF MAKING AND USING THE SAME

CROSS REFERENCE TO RELATED APPLICATIONS

This application claims the benefit under 35 USC 119 (e) to U.S. Provisional Application No. 63/039,021 filed on Jun. 15, 2020, which is hereby incorporated by reference in its entirety.

FIELD OF THE DISCLOSURE

The present application relates to an avian cell line capable of supporting viral growth of Marek's disease virus, including herpes virus of turkeys (HVT), methods of producing such cell lines, and therapeutic uses of the cell lines and resulting vaccines. In certain embodiments the cell line is a chicken embryo fibroblast (CEF) cell line. In other embodiments, the cell line has been genetically modified, such as by CRISPR-Cas9 gene editing, to include a knockout or knock-down (deletion or disruption) of one or more genes, such as the HTR2A gene or SLAMF8 gene.

BACKGROUND OF THE INVENTION

Marek's disease virus is the etiological agent of a neoplastic lymphoproliferative disorder in poultry. The virus causes mononuclear cell infiltration and the development of lymphomas, mainly in the peripheral nerves and visceral organs. Marek's disease results in a wide range of symptoms, including lesions of the peripheral nerves; tumors in one or more organs, including spleen, liver, kidneys, lungs, and heart; difficulty breathing; ocular lymphomatosis; and immunosuppression. In an immune naive flock, Marek's disease infection can become epidemic, resulting in up to 80% mortality.

Marek's disease is caused by a highly contagious alpha-herpesvirus, referred to as Gallid alpha-herpesvirus-2 (GaHV-2) or simply "Marek's Disease Virus" (MDV). Three MDV serotypes have been identified: serotype 1 (MDV-1), serotype 2 (MDV-2) and serotype 3 (herpesvirus of turkeys or HVT). Of these only the first is pathogenic.

There is currently no known cure or treatment for birds infected with MDV. Control of the disease is currently done solely by administration of a vaccine. Effective vaccines can prevent birds later infected with MDV from developing neoplastic disease, though they do not prevent infection with virulent MDV or shedding of the virus from infected birds. Due to ever increasing virulence in naturally occurring MDV, the poultry industry throughout most of the world now vaccinates all commercial chicken flocks against MDV. Thus, the economic importance of MDV and MDV vaccines is very high.

Avirulent MDV, MDV-2 and HVT, has been used for vaccination of flocks since the 1970s and, in combination with attenuated serotype 1 vaccines, can successfully control the disease. Currently, these vaccine viruses are grown in embryonated eggs or primary cells derived from embryonated eggs. Use of embryonated eggs and primary cells for viral growth is labor intensive and costly. Further, although the source of the embryos is from specific pathogen free (SPF) flocks, there have been occasions where the flock was contaminated with some extraneous agent thereby contaminating the vaccine. In addition to this risk, there can also be supply issues as eggs from SPF flocks are also used for manufacturing certain human vaccines, such as influenza. For these reasons, there is a need to develop new cost-effective strategies to produce HVT and MDV vaccines thereby reducing reliance on the use of primary chicken embryo fibroblast (CEF) cells for vaccine production.

One approach to overcoming the dependence of HVT vaccine production on primary CEFs is the use of an immortalized cell line to replace primary cells. Immortalized cells are superior in certain regards as they can be stockpiled and expanded as required and have little variation in cell growth rate or in viral replication from batch to batch. Although immortalized cell lines are currently used for production of other vaccines, only a very few of spontaneously immortalized avian cell lines have been developed that can support HVT growth to any significant level in the absence of prolonged virus adaptation. A continuous cell line capable of providing comparable virus yield/titer to that achieved in primary cells would result in significant cost savings and eliminate risk of supply and contamination by SPF flocks with extraneous agents. Thus, there remains a need in the art for improved cell lines capable of supporting MDV growth.

SUMMARY OF THE INVENTION

In one aspect the present invention provides a genetically modified cell line capable of supporting high titer growth of a Marek's Disease Virus (MDV). In one embodiment the genetically modified cell line provides a starting cell line that comprises an immortalized avian cell line. In one embodiment the starting cell line selected from the group consisting of: JBJ-1, DF-1; LF-1; LMH; SL-29; DT-40; ESCDL-1; SC-1; SC-2; and ST-2. In one embodiment the starting cell line is selected from the group consisting of: JBJ-1; DF-1; LF-1; SC-1; SC-2; and ST-2. In one embodiment the starting cell line is JBJ-1.

In one embodiment the Marek's Disease Virus (MDV) that is produced by the genetically modified cell line of the invention comprises MDV Seroptype-1 (MDV-1, example CV 1988), MDV Serotype-2 (MDV-2, SB-1) or MDV Serotype-3 (MDV-3, Herpesvirus of Turkey/HVT). In one embodiment the MDV comprises MDV-1. In one embodiment the MDV comprises MDV-2, In one embodiment the MDV comprises MDV-3. In one embodiment the MDV of the invention is not recombinant. In one embodiment the MDV of the invention is a recombinant MDV.

In one embodiment the present invention provides that the MDV produced by the genetically modified cell line of the invention is recombinant and comprises one or more heterologous antigens inserted into one or more locations in the MDV genome. In one embodiment the one or more heterologous antigens comprise antigens from avian pathogens. In one embodiment the avian pathogens comprise pathogenic avian viruses. In one embodiment said avian pathogens are selected from the group consisting of: Infectious Bursal Disease Virus; Infectious Bronchitis Virus; Infectious Laryngotracheitis Virus; Newcastle Disease Virus; Chicken Anemia Virus and Avian Influenza Virus.

In one embodiment the present invention provides a pharmaceutical composition comprising the MDV produced by the genetically modified cell line of the invention.

In one embodiment the present invention provides an immunogenic composition comprising the pharmaceutical composition of the invention which comprises the MDV produced by the genetically modified cell line of the invention.

In one embodiment the invention provides a vaccine comprising the pharmaceutical composition of the invention which comprises the MDV produced by the genetically modified cell line of the invention.

In one embodiment the present invention provides a method of treating an avian comprising administering a therapeutic amount of the vaccine of the invention that comprises the MDV produced by the genetically modified cell line of the invention.

In one aspect the present invention provides a method of producing a genetically modified cell line capable of supporting high-titer growth of Marek's Disease Virus (MDV), the method comprising providing a starting cell line, wherein said starting cell line is an immortalized avian cell line, and producing a genetically modified cell line by genetically altering the starting cell line to reduce expression thereby altering functional activity of the product of one or both of gene HTR2A and SLAMF8, wherein the genetically modified cell line is capable of supporting increased MDV viral titer as compared to the starting cell line when infected with the same MDV strain.

In one embodiment the invention provides a starting cell line selected from the group consisting of: JBJ-1, DF-1; LF-1; LMH; SL-29; DT-40; ESCDL-1; SC-1; SC-2; and ST-2. In one embodiment the starting cell line is selected from the group consisting of: JBJ-1; DF-1; LF-1; SC-1; SC-2; and ST-2. In one embodiment the starting cell line is JBJ-1.

In one or more embodiments the method of the invention provides a cell line comprising a genetic alteration comprises altering the genome using TALENs, ZFNs, CRISPR-Cas9, or alternative CRISPR-Cas enzymes. In one embodiment the genetic alteration comprising altering the genome using CRISPR-Cas9.

In one or more embodiments the method of the invention provides the genetic alteration of a cell line comprising a homozygous alteration of the HTRA2A or SLAMF8 gene using CRISPR-Cas9.

In one or more embodiments the invention provides that the MDV produced by the method of the invention is selected from an MDV-1 (example CV 1988), MDV-2 (SB-1) and MDV-3 (Herpesvirus of Turkey/HVT). In one or more embodiments the method of the invention provides a genetically modified cell line supports an MDV viral titer at least 10-fold higher than the starting cell line when infected with the same MDV strain.

In one or more embodiments the method of the invention provides a genetically modified cell line supports an MDV viral titer at least 50-fold higher than the unmodified cell line when infected with the same MDV strain.

In one or more embodiments the method of the invention provides a genetically modified cell line that supports an MDV viral titer that is within 2-fold of the viral titer achieved with the same MDV strain on primary chicken embryo fibroblast (CEF) cells.

In one or more embodiments the method of the invention provides the genetically modified cell line comprises a genetic alteration that alters the functional activity of the product of the HTR2A gene.

In one or more embodiments the method of the invention provides the genetically modified cell line further comprises a genetic alteration that alters functional activity of the product of one or more additional genes selected from the group consisting of STAT4, COBBL2, and CTSL. In one embodiment the additional gene comprises STAT4.

In one or more embodiments the method of the invention provides a genetic alteration in a cell line comprises altering the genome using TALENs, ZFNs, or CRISPR-Cas9, or alternative CRISPR-Cas enzymes. In one or more embodiments the genetic alteration comprises altering the genome using CRISPR-Cas9.

In one aspect the invention provides a genetically modified cell line capable of supporting high-titer growth of MDV, produced by one or more embodiments of the method of the invention. In one embodiment the invention provides a genetically modified cell line wherein the MDV comprises nucleic acids that encode heterologous antigens inserted into one or more locations in the MDV genome. In one embodiment the heterologous antigens are encoding by genes derived from poultry pathogens selected from the group consisting of: Newcastle Disease Virus; Infectious Bursal Disease Virus; Infectious Bronchitis Virus; Avian Influenza Virus; Infectious Laryngotracheitis Virus and Chicken Anemia Virus.

In one aspect the invention provides a method of preparing an MDV vaccine comprising preparing a genetically modified cell line by one or more embodiments of the method of the invention and growing MDV in said genetically modified cell line.

In one embodiment the invention provides an immunogenic composition comprising the MDV prepared by one or more embodiments of the method of the invention.

In one embodiment the invention provides an MDV vaccine prepared by one or more embodiments of the method of the invention.

BRIEF DESCRIPTION OF THE SEQUENCES

Figure 1:
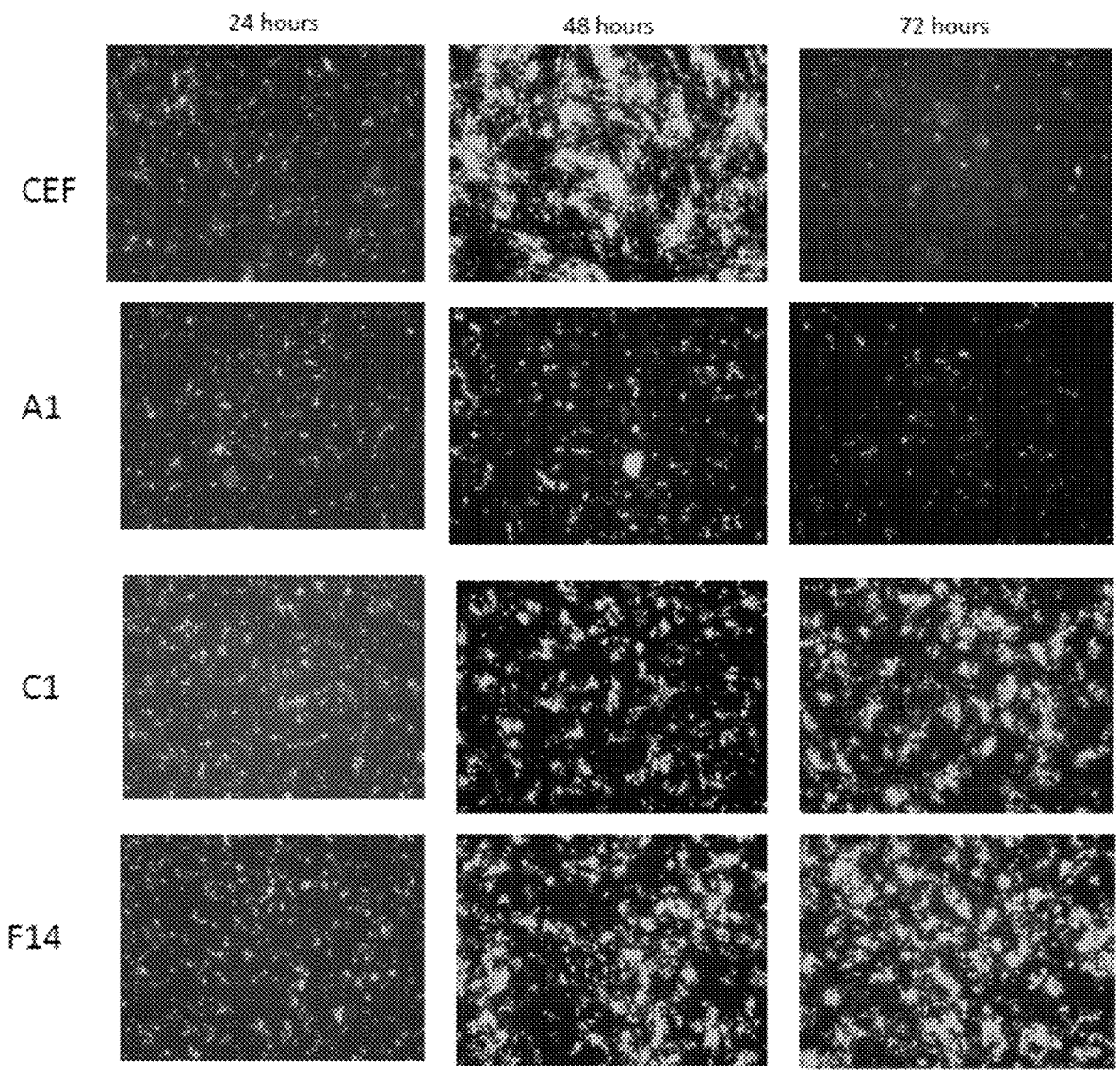
FIG. 1 presents fluorescent images of CEF and HTR2A-modified JBJ-1 cells infected with an HVT virus carrying the gene for green fluorescent protein (GFP) (HVT-ND-GFP) at 24, 48, and 72 hours post-infection.

SEQ ID NO: 1 comprises the nucleotide sequence for the DNA primer SORF1 F1.

SEQ ID NO: 2 comprises the nucleotide sequence for the DNA primer SORF1 R1.

SEQ ID NO. 3 comprises the nucleotide sequence for the DNA primer SORF1 S1.

SEQ ID NO: 4 comprises the nucleotide sequence for the DNA SORF1 STD.

SEQ ID NO: 5 comprises the nucleotide sequence for the DNA primer OVO (TF) F1.

SEQ ID NO: 6 comprises the nucleotide sequence for the DNA primer OVO (TF) R1.

SEQ ID NO: 7 comprises the nucleotide sequence for the DNA primer OVO (TF) S.

SEQ ID NO: 8 comprises the nucleotide sequence for the DNA OVO (TF) STD.

SEQ ID NO: 9 comprises the nucleotide sequence for the BLEC2 gRNA sequence used to transfect JBJ-1 cells.

SEQ ID NO: 10 comprises the nucleotide sequence for the HTR2A gRNA sequence used to transfect JBJ-1 cells.

SEQ ID NO: 11 comprises the nucleotide sequence for the SLAMF8 gRNA sequence used to transfect JBJ-1 cells.

SEQ ID NO: 12 comprises the nucleotide sequence for the cbPCR primer HTR2A F-out.

SEQ ID NO: 13 comprises the nucleotide sequence for the cbPCR primer HTR2A R-out.

SEQ ID NO: 14 comprises the nucleotide sequence for the cbPCR primer HTR2A F-In.

SEQ ID NO: 15 comprises the nucleotide sequence for the SLAMF8 primer SLAMF8 F-Out.

SEQ ID NO: 16 comprises the nucleotide sequence for the SLAMF8 primer SLAMF8 R-out.

SEQ ID NO: 17 comprises the nucleotide sequence for the SLAMF8 primer SLAMF8 F-in.

SEQ ID NO: 18 comprises the nucleotide sequence for the BLEC2 primer BLEC2 F-Out.

SEQ ID NO: 19 comprises the nucleotide sequence for the BLEC2 primer BLEC2 R-out.

SEQ ID NO: 20 comprises the nucleotide sequence for the BLEC2 primer BLEC2 F-in.

SEQ ID NO: 21 comprises the nucleotide sequence for the BLEC2 primer BLEC2 R-in.

SEQ ID NO: 22 comprises the nucleotide sequence for the gRNA for STAT4.

SEQ ID NO: 23 comprises the nucleotide sequence for the cbPCR primer for STAT4 F-out.

SEQ ID NO: 24 comprises the nucleotide sequence for the cbPCR primer for STAT4 R-out.

SEQ ID NO: 25 comprises the nucleotide sequence for the cbPCR primer for STAT4 R-in.

SEQ ID NO: 26 comprises the nucleotide sequence for the gRNA for CTSL2.

SEQ ID NO: 27 comprises the nucleotide sequence for the cbPCR for CTSL2 F-out.

SEQ ID NO: 28 comprises the nucleotide sequence for the cbPCR for CTSL2 R-out.

SEQ ID NO: 29 comprises the nucleotide sequence for the cbPCR for CTSL2 F-in.

SEQ ID NO: 30 comprises the nucleotide sequence for the gRNA for CTSL2.

SEQ ID NO: 31 comprises the nucleotide sequence for the cbPCR for CTSL2 F-out.

SEQ ID NO: 32 comprises the nucleotide sequence for the cbPCR for CTSL2 R-out.

SEQ ID NO: 33 comprises the nucleotide sequence for the cbPCR for CTSL2 F-in.

DETAILED DESCRIPTION

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Definitions:

Before describing the present invention in detail, several terms used in the context of the present invention will be defined. In addition to these terms, others are defined elsewhere in the specification as necessary. Unless otherwise expressly defined herein, terms of art used in this specification will have their art-recognized meanings.

Definitions

It is noted that in this disclosure, terms such as "comprises", "comprised", "comprising", "contains", "containing", "consisting", "consisted", "consisting essentially of", "includes", "included" and the like are defined according to standard United States and international patent law practice The term "about" is used herein to indicate that a value includes the standard deviation of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." When not used in conjunction closed wording in the claims or specifically noted otherwise, the words "a" and "an" denote "one or more."

The term "amino acid" refers to naturally occurring and synthetic amino acids, as well as amino acid analogs and amino acid mimetics that function in a manner similar to the naturally occurring amino acids. Naturally occurring amino acids are those encoded by the genetic code, as well as those amino acids that are later modified, ex. hydroxyproline, γ-carboxyglutamate, and O-phosphoserine. Amino acid analogs refer to compounds that have the same basic chemical structure as a naturally occurring amino acid, i.e., an α carbon that is bound to a hydrogen, a carboxyl group, an amino group, and an R group, ex. homoserine, norleucine, methionine sulfoxide, methionine methyl sulfonium. Such analogs have modified R groups (ex. norleucine) or modified peptide backbones but retain the same basic chemical structure as a naturally occurring amino acid. Amino acid mimetics refers to chemical compounds that have a structure that is different from the general chemical structure of an amino acid, but that functions in a manner similar to a naturally occurring amino acid.

Amino acids may be referred to herein by either their commonly known three letter symbols or by the one-letter symbols recommended by the IUPAC-IUB Biochemical Nomenclature Commission. Nucleotides, likewise, may be referred to by their commonly accepted single-letter codes. Macromolecular structures such as polypeptide structures may be described in terms of various levels of organization. "Primary structure" refers to the amino acid sequence of a particular peptide. "Secondary structure" refers to locally ordered, three dimensional structures within a polypeptide. These structures are commonly known as domains, for example enzymatic domains, extracellular domains, transmembrane domains, pore domains, or cytoplasmic tail domains. Domains are portions of a polypeptide that form a compact unit of the polypeptide. Exemplary domains include domains with enzymatic activity. A domain may be made up of sections of lesser organization such as stretches of β-sheet and α-helices. "Tertiary structure" refers to the complete three-dimensional structure of a polypeptide monomer. "Quaternary structure" refers to the three-dimensional structure formed by the noncovalent association of independent tertiary units. Anisotropic terms are also known as energy terms.

The term "avian" as used herein, includes poultry such as members of the order Galliformes. More particularly a class of birds more with economical and/or agronomical interest, such as chicken, turkeys, goose, duck, pheasant, ostrich, pigeon and quail and the like.

The term 'conservative amino acid substitution" indicates any amino acid substitution for a given amino acid residue, where the substitute residue is so chemically similar to that of the given residue that no substantial decrease in polypeptide function (e.g., enzymatic activity) results. Conservative amino acid substitutions are commonly known in the art and examples thereof are described, e.g., in U.S. Pat. Nos.

6,790,639, 6,774,107, 6,194,167, or 5,350,576. In a preferred embodiment, a conservative amino acid substitution will be anyone that occurs within one of the following six groups:

Small aliphatic, substantially non-polar residues: Ala, Gly, Pro, Ser, and Thr;
Large aliphatic, non-polar residues: lie, Leu, and Val; Met;
Polar, negatively charged residues and their amides: Asp and Glu;
Amides of polar, negatively charged residues: Asn and Gin; His;
Polar, positively charged residues: Arg and Lys; His; and
Large aromatic residues: Trp and Tyr; Phe.

A conservative amino acid substitution, as used herein, will be any one of the following, which are listed as Native Residue (Conservative Substitutions) pairs: Ala (Ser); Arg (Lys); Asn (Gin; His); Asp (Glu); Gin (Asn); Glu (Asp); Gly (Pro); His (Asn; Gln); lie (Leu; Val); Leu (lie; Val); Lys (Arg; Gin; Glu); Met (Leu; lie); Phe (Met; Leu; Tyr); Ser (Thr); Thr (Ser); Trp (Tyr); Tyr (Trp; Phe); and Val (lie; Leu).

The phrase "functional effects" in the context of assays for testing compounds that modulate activity of a virus as described herein includes the determination of a parameter that is indirectly or directly under the influence of such a virus, ex. a phenotypic or chemical effect. "Functional effects" may include in vitro, in vivo, and ex vivo activities and may be measured by any means known to those skilled in the art, such as changes in spectroscopic characteristics, shape, chromatographic, or solubility properties for a protein, measuring inducible markers or transcriptional activation of a protein; measuring binding activity or binding assays, e.g. binding to antibodies; measuring changes in ligand or substrate binding activity, measuring viral replication, measuring cell surface marker expression, measurement of changes in protein levels, measurement of RNA stability, identification of downstream or reporter gene expression via, for example, chemiluminescence, fluorescence, colorimetric reactions, antibody binding, and/or inducible markers.

The term "gene" refers to components that comprise DNA or RNA, cDNA, intron and exon DNA, artificial DNA polynucleotide, or other DNA that encodes a peptide, polypeptide, protein, or RNA transcript molecule, and the genetic elements that may flank the coding sequence that are involved in the regulation of expression, such as, promoter regions, 5' leader regions, 3' untranslated region that may exist as native genes or transgenes. The gene or a fragment thereof can be subjected to polynucleotide sequencing methods that determines the order of the nucleotides that comprise the gene.

The term "Herpesvirus of Turkey (HVT)" is defined as a nonpathogenic virus of domestic turkeys and it is classified as the third serotype within the Marek's disease virus group of antigenically and genetically related lymphotropic avian herpes viruses The term "heterologous" when used with reference to portions of a nucleic acid indicates that the nucleic acid comprises two or more sequences that are not found in the same relationship to each other in nature. For instance, the nucleic acid is typically recombinantly produced, having two or more sequences from unrelated genes arranged to make a new functional nucleic acid, ex. a promoter from one source and a coding region from another source. Similarly, a heterologous protein indicates that the protein comprises two or more subsequences that are not found in the same relationship to each other in nature (ex. a fusion protein). Heterologous may also refer to a viral sequence, such as a gene or transgene, or a portion thereof, being inserted into a viral genome in which it is not typically found, or a gene introduced into an organism in which it is not typically found.

The term "host cell" means any cell of any organism that is selected, modified, transformed, grown, or used or manipulated in any way, to produce a substance by the cell, for example the expression by the cell of a gene, a DNA or RNA sequence, a protein or an enzyme. A host cell is intended to include any individual cell or cell culture which can be or has been a recipient for vectors or for the incorporation of exogenous nucleic acid molecules, polynucleotides, and/or proteins. It also is intended to include progeny of a single cell. The progeny may not necessarily be completely identical (in morphology or in genomic or total DNA complement) to the original parent cell due to natural, accidental, or deliberate mutation.

As used herein, the term "host," "subject," "patient," or "organism" may include animals, particularly birds, especially poultry. For veterinary applications, birds may be from the order Galliformes, which includes chickens, quails and turkeys, and the like. The term "living host" refers to a host as noted above or another organism that is alive. The term may also refer to the entire host or organism and not just a part excised (ex. a brain or other organ) from the living host. These terms also include an individual in all stages of development, including embryonic and fetal stages.

The terms "identical" or "percent identity," in the context of two or more nucleic acids or polypeptide sequences, refer to two or more sequences or subsequences that are the same or have a specified percentage of amino acid residues or nucleotides that are the same (i.e., about 60% identity, preferably 65%, 70%, 75%, 80%, 85%, 90%, 91%, 92%, 93%, 94%, 95%, 96%, 97%, 98%, 99%, or higher identity over a specified region, when compared and aligned for maximum correspondence over a comparison window or designated region) as measured using a BLAST or BLAST 2.0 sequence comparison algorithms with default parameters described below, or by manual alignment and visual inspection (see, ex. the NCBI web site found at ncbi.nlm.nih.gov/BLAST/ or the like). Such sequences are then referred to as "substantially identical." This definition also refers to, or applies to, the compliment of a particular sequence. The definition may also include sequences that have deletions, additions, and/or substitutions.

For sequence comparison, one sequence typically serves as a reference sequence, to which other sequences are compared. When using a sequence comparison algorithm, reference and comparison sequences may be entered into a computer, and sequence algorithm program parameters are selected as desired. Percent sequence identities are then generated for the comparison sequences relative to the reference sequence, based on the parameters selected. An example of an algorithm that may be suitable for determining percent sequence identity and sequence similarity are the BLAST and BLAST 2.0 algorithms, which are described in Altschul et al., (Nuc Acids Res 25:3389-3402, 1977) and Altschul et al., (J Mol Biol 215:403-410, 1990), respectively. BLAST and BLAST 2.0 are well known in the art and may be used to determine percent sequence identity for any nucleic acids or proteins, such as those described herein.

As used herein, an "immunogenic composition" or "pharmaceutical composition" or "vaccine" is meant to encompass a composition comprising an antigen suitable for administration to a subject, such as an avian subject. Said composition is generally meant to elicit an immune response in a subject. The immune response can include a T cell response, a B cell response, or both a T cell and B cell response. The composition may serve to sensitize the subject patient by the presentation of antigen in association with MHC molecules at the cell surface. In addition, antigen-specific T-lymphocytes or antibodies can be generated to allow for the future protection of an immunized host. An "immunogenic composition" may contain a live, attenuated, or killed/inactivated vaccine comprising a whole microorganism or an immunogenic portion derived therefrom that induces either a cell-mediated (T cell) immune response or an antibody-mediated (B cell) immune response, or both, and may protect the animal from one or more symptoms associated with infection by the microorganism, or may protect the animal from death due to the infection with the microorganism. In general, an "immunogenic composition" is sterile, and preferably free of contaminants that can elicit an undesirable response within the subject (ex. the compound(s) in the immunogenic composition is pharmaceutical grade). Immunogenic compositions may be designed for administration to subjects in need thereof via a number of different routes of administration including in ovo, oral, intravenous, buccal, rectal, parenteral, intraperitoneal, intradermal, intracheal, intramuscular, subcutaneous, inhalational, and the like.

The term "immunogenic" protein or peptide as used herein includes polypeptides that are immunologically active in the sense that once administered to the host, it is able to evoke an immune response of the humoral and/or cellular type directed against the protein. Preferably the protein fragment is such that it has substantially the same immunological activity as the full-length protein. Thus, a protein fragment according to the invention comprises or consists essentially of or consists of at least one epitope or antigenic determinant. An "immunogenic" protein or polypeptide, as used herein, includes the full-length sequence of the protein, analogs thereof, or immunogenic fragments thereof. By "immunogenic fragment" is meant a fragment of a protein which includes one or more epitopes and thus elicits the immunological response described above.

The term "immunogenic protein or peptide" further contemplates deletions, additions and substitutions to the sequence, as long as the polypeptide functions to produce an immunological response as defined herein. The term "conservative variation" denotes the replacement of an amino acid residue by another biologically similar residue, or the replacement of a nucleotide in a nucleic acid sequence such that the encoded amino acid residue does not change or is another biologically similar residue. In this regard, particularly preferred substitutions will generally be conservative in nature, i.e., those substitutions that take place within a family of amino acids. For example, amino acids are generally divided into four families: (1) acidic—aspartate and glutamate; (2) basic—lysine, arginine, histidine; (3) non-polar—alanine, valine, leucine, isoleucine, proline, phenylalanine, methionine, tryptophan; and (4) uncharged polar—glycine, asparagine, glutamine, cysteine, serine, threonine, tyrosine. Phenylalanine, tryptophan, and tyrosine are sometimes classified as aromatic amino acids. Examples of conservative variations include the substitution of one hydrophobic residue such as isoleucine, valine, leucine or methionine for another hydrophobic residue, or the substitution of one polar residue for another polar residue, such as the substitution of arginine for lysine, glutamic acid for aspartic acid, or glutamine for asparagine, and the like; or a similar conservative replacement of an amino acid with a structurally related amino acid that will not have a major effect on the biological activity. Proteins having substantially the same amino acid sequence as the reference molecule but possessing minor amino acid substitutions that do not substantially affect the immunogenicity of the protein are, therefore, within the definition of the reference polypeptide. All of the polypeptides produced by these modifications are included herein. The term "conservative variation" also includes the use of a substituted amino acid in place of an unsubstituted parent amino acid provided that antibodies raised to the substituted polypeptide also immunoreact with the unsubstituted polypeptide.

An "immunologically effective amount" as used herein refers to the amount of antigen or vaccine sufficient to elicit an immune response, either a cellular (T cell) or humoral (B cell or antibody) response, as measured by standard assays known to one skilled in the art. For example, with respect to the present invention, an "immunologically effective amount" is a minimal protection dose (titer). The effectiveness of an antigen as an immunogen, can be measured either by proliferation assays, by cytolytic assays, such as chromium release assays to measure the ability of a T cell to lyse its specific target cell, or by measuring the levels of B cell activity by measuring the levels of circulating antibodies specific for the antigen in serum or other assays which are known and used by those of skill in the art. Furthermore, the level of protection of the immune response may be measured by challenging the immunized host with the antigen that has been injected. For example, if the antigen to which an immune response is desired is a virus or a tumor cell, the level of protection induced by the "immunologically effective amount" of the antigen is measured by detecting the percent survival or the percent mortality after virus or tumor cell challenge of the animals.

Determination of what is an immunologically effective amount of the vaccine according to the invention is well within reach of the skilled person, for instance by monitoring the immunological response following vaccination, or after a challenge infection, e.g. by re-isolation of the pathogen, or by monitoring the targets' clinical signs of disease, or serological parameters, and comparing these to responses seen in mock-vaccinated animals. The dosing scheme for applying the vaccine according to the invention to a target organism can be in single or multiple doses, which may be given at the same time or sequentially, in a manner compatible with the formulation of the vaccine, and in such an amount as will be immunologically effective.

The terms "inhibitors," activators," and "modulators" of viral nucleic acid and polypeptide sequences are used to refer to activating, inhibitory, or modulating molecules identified using in vitro and in vivo assays of the viral nucleic acid and polypeptide sequences. Inhibitors are compounds that may bind to, partially or totally block activity, decrease, prevent, delay activation, inactivate, desensitize, or down regulate the activity or expression of a virus. Activators refer to compounds that increase, open, activate, facilitate, enhance activation, sensitize, agonize, or up regulate viral activity. Inhibitors, activators, or modulators also include genetically modified versions of a virus as described herein, ex. versions with altered activity, as well as naturally occurring and synthetic ligands, substrates, antagonists, agonists, antibodies, peptides, cyclic peptides, nucleic acids, antisense molecules, ribozymes, small chemical molecules and the like. Assays for inhibitors and activators include, ex. expressing a virus is the invention in vitro, in cells, or cell membranes, applying putative modulator compounds, and then determining the functional effects on activity, as described herein.

Test samples or assays comprising a virus of the invention that are treated with a potential activator, inhibitor, or modulator may be compared to a control sample lacking the inhibitor, activator, or modulator in order to determine the extent of inhibition. Control samples to which a test sample or assay is compared may be assigned a relative protein activity value of 100%. Inhibition of virus is achieved when the activity value of the test sample relative to the control sample is less than about 80%, including about 75%, about 70%, about 65%, about 60%, about 55%, about 50%, about 45%, about 40%, about 35%, about 30%, about 25%, about 20%, about 15%, about 10%, about 5%, and about 0%.

As used herein "Marek's Disease Virus" or "MDV" refers to any alphaherpesvirus of the genus Mardivirus, which includes the Herpesvirus of Turkeys (HVT), as described herein. In a specific embodiment, the invention relates to the Marek's Disease Virus, its genetic components, genes, and proteins produced thereby. As used herein, such a virus may include the genetic components of the virus, i.e., the genome and transcripts thereof, proteins encoded by the genome (including structural and nonstructural proteins), and functional or nonfunctional viral particles. The polynucleotide and polypeptide sequences encoding such viruses are well known in the art and would be easily found by one of skill in the art.

The terms "mutant" and "mutation" mean any detectable change in genetic material, ex. DNA, or any process, mechanism, or result of such a change. This includes gene mutations, in which the structure (ex. DNA sequence) of a gene is altered, any gene or DNA arising from any mutation process, and any expression product (ex. protein or enzyme) expressed by a modified gene or DNA sequence. The term "variant" may also be used to indicate a modified or altered gene, DNA sequence, enzyme, cell, etc., i.e., any kind of mutant.

As used herein, the term "nucleic acid" refers to a single or double-stranded polymer of deoxyribonucleotide bases or ribonucleotide bases read from the 5' to the 3' end. A "nucleic acid" may also optionally contain non-naturally occurring or altered nucleotide bases that permit correct read through by a polymerase and do not reduce expression of a polypeptide encoded by that nucleic acid.

The term "nucleotide sequence" or "nucleic acid sequence" refers to both the sense and antisense strands of a nucleic acid as either individual single strands or in the duplex. The term "ribonucleic acid" (RNA) is inclusive of RNAi (inhibitory RNA), dsRNA (double stranded RNA), siRNA (small interfering RNA), mRNA (messenger RNA), miRNA (micro-RNA), tRNA (transfer RNA, whether charged or discharged with a corresponding acylated amino acid), and cRNA (complementary RNA). The terms "nucleic acid segment," "nucleotide sequence segment," or more generally, "segment," will be understood by those in the art as a functional term that includes genomic sequences, ribosomal RNA sequences, transfer RNA sequences, messenger RNA sequences, operon sequences, and smaller engineered nucleotide sequences that express or may be adapted to express, proteins, polypeptides or peptides. The nomenclature used herein is that required by Title 37 of the United States Code of Federal Regulations § 1.822 and set forth in the tables in WIPO Standard ST.25 (1998), Appendix 2, Tables 1 and 3.

The term "pharmaceutically acceptable carrier" refers to an ingredient in a pharmaceutical formulation, other than an active ingredient, that is physiologically compatible to administer to a subject. Pharmaceutically acceptable carrier includes, but is not limited to a buffer, excipient, stabilizer, adjuvant, preservative, diluent, aqueous or non-aqueous vehicle and other additives. Additionally, this term refers to an element of an immunogenic composition or vaccine that is generally approved by a regulatory agency of a Federal, a state government, or other regulatory agency, or listed in the U.S. Pharmacopeia or other generally recognized pharmacopeia for use in both human and non-human animals. Such pharmaceutical carriers can be sterile liquids, such as water and oils, including those of petroleum, animal, vegetable or synthetic origin, such as peanut oil, soybean oil, mineral oil, sesame oil and the like. Water is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained release formulations and the like. The composition can be formulated as a suppository, with traditional binders and carriers such as triglycerides. Oral formulation can include standard carriers such as pharmaceutical grades of mannitol, lactose, starch, magnesium stearate, sodium saccharine, cellulose, magnesium carbonate, etc. Examples of suitable pharmaceutical carriers are described in "Remington's Pharmaceutical Sciences" by E. W. Martin. The formulation should suit the mode of administration.

As used herein, "poultry" refers to a domestic or commercial bird kept for the eggs they produce, as well as their meat and feathers. In some embodiments, poultry may include a bird from the order Galliformes, which includes chickens, quails, and turkeys, and may also include geese, ducks, swan, guinea, pigeons, and the like.

Polynucleotides as described herein may be complementary to all or a portion of a viral gene sequence, including a promoter, intron, coding sequence, exon, 5' untranslated region, and 3' untranslated region.

The terms "polypeptide," "peptide" and "protein" are used interchangeably herein to refer to a polymer of amino acid residues. The terms apply to amino acid polymers in which one or more amino acid residue is an artificial chemical mimetic of a corresponding naturally occurring amino acid, as well as to naturally occurring amino acid polymers and non-naturally occurring amino acid polymer.

The terms "polyvalent vaccine", "combination or combo vaccine" and "multivalent vaccine" are used interchangeably to refer to a vaccine containing more than one antigen. The polyvalent vaccine may contain two, three, four or more antigens. The polyvalent vaccine may comprise recombinant viral vectors, active or attenuated or killed wild-type viruses, or a mixture of recombinant viral vectors and wild-type viruses in active or attenuated or killed forms.

"Promoters", as used herein, refer to DNA sequences that define where transcription of a gene by RNA polymerase begins. Promoters are typically located upstream of the transcription initiation site. A promoter can also comprise a distal enhancer or repressor elements, which can be located as much as several thousand nucleotides from transcription start site. Promoters define the direction of transcription and indicate which DNA strand will be transcribed. A promoter can be derived from sources including viral, bacterial, fungal, plants, insects, and animals. A promoter can regulate the expression of a gene component constitutively or differentially with respect to cell, the tissue or organ in which expression occurs or, with respect to the developmental stage at which expression occurs, or in response to external stimuli such as physiological stresses, pathogens, metal ions, or inducing agents. Representative examples of promoters include the bacteriophage T7 promoter, bacteriophage T3 promoter, SP6 promoter, lac operator-promoter, tac promoter, RSV-LTR promoter, CMV IE promoter, human CMV promoter; murine CMV promoter; Pec promoter; β-chicken actin promoter; a guinea pig CMV promoter, a Pseudorabies Virus promoter; a glycoprotein X promoter, a Herpes Simplex Virus-1 promoter; a Marek's Disease Virus promoter; and an SV40 promoter.

As used herein, the terms "prophylactically treat" or "prophylactically treating" refers to completely or partially preventing a disease or symptom thereof and/or may be therapeutic in terms of a partial or complete cure for a disease and/or adverse effect attributable to the disease.

The term "recombinant" when used with reference, ex. to a cell, or nucleic acid, protein, or vector, indicates that the cell, nucleic acid, protein or vector, has been modified by the introduction of a heterologous nucleic acid or protein or the alteration of a native nucleic acid or protein, or that the cell is derived from a cell so modified. Thus, for example, recombinant cells express genes that are not found within the native (non-recombinant) form of the cell or express native genes that are otherwise abnormally expressed, under expressed or not expressed at all. In some embodiments, recombinant sequences may also include nucleic acids, proteins, or recombinant genomes, such as viral genomes. Recombinant viral vectors as described herein may contain transgenes that are operatively linked to a heterologous promoter in order to effect transcription of the transgene.

The term "therapeutically effective amount," "effective amount," or "therapeutically effective dose" as used herein refers to a dose that produces an effect for which it is administered. Such a dose or amount may also refer to the amount of an embodiment of the agent being administered that will relieve to some extent one or more of the symptoms of the disease, i.e., infection, being treated, and/or that amount that will prevent, to some extent, one or more of the symptoms of the disease, i.e., infection, that the host being treated has or is at risk of developing. The exact dose will depend on the purpose of the treatment, and one of skill in the art will be able to determine such a dose using techniques known in the art.

As used herein, the terms "treatment," "treating," and "treat" are defined as acting upon a disease, disorder, or condition with an agent to reduce or ameliorate the pharmacologic and/or physiological effects of the disease, disorder, or condition and/or its symptoms. "Treatment," as used herein, covers any treatment of a disease in a subject or host (ex. an animal of veterinary interest), and includes: (a) reducing the risk of occurrence of the disease in a subject determined to be predisposed to the disease but not yet diagnosed as infected with the disease, (b) impeding the development of the disease, and (c) relieving the disease, i.e., causing regression of the disease and/or relieving one or more disease symptoms. "Treatment" is also meant to encompass delivery of an inhibiting agent to provide a pharmacologic effect, even in the absence of a disease or condition. For example, "treatment" encompasses delivery of a disease or pathogen inhibiting agent that provides for enhanced or desirable effects in the subject (ex. reduction of pathogen load, reduction of disease symptoms, etc.).

The term "unit dosage form," as used herein, refers to physically discrete units suitable as unitary dosages for animal subjects, each unit containing a predetermined quantity of a compound (ex. an antiviral compound, as described herein) calculated in an amount sufficient to produce the desired effect in association with a pharmaceutically acceptable diluent, carrier, or vehicle. The specifications for unit dosage forms depend on the particular compound employed, the route and frequency of administration, the effect to be achieved, and the pharmacodynamics associated with each compound in the host.

The terms "vaccine" or "vaccine composition", which are herein used interchangeably, refer to pharmaceutical compositions comprising at least one immunogenic composition of the invention that induces an immune response in subject. A vaccine or vaccine composition may protect the subject from disease or possible death and may or may not include one or more additional components that enhance the immunological activity of the active component. The composition of the invention that induces a protective immune response comprises a recombinant HVT virus generated in the cell line of the invention. In some embodiments the composition of the invention comprises a recombinant HVT virus having one or more heterologous antigen encoding genes inserted into the HVT. In some embodiments the antigen encoding genes are antigens derived from poultry pathogens such as Newcastle Disease Virus, Infectious Bursal Disease Virus, Infectious Bronchitis Virus, Avian Influenza Virus, Infectious Laryngotracheitis Virus and/or Chicken Anemia Virus. In some embodiments the recombinant HVT is combined with another recombinant Marek's Disease Virus vaccine that causes a protective immune response in poultry. The vaccine or vaccine composition of the invention may additionally comprise further components typical to vaccines or vaccine compositions, including, for example, an adjuvant or an immunomodulator. A vaccine may comprise one or simultaneously more than one of the elements described above.

The vaccine of the invention may further comprise a suitable pharmaceutical carrier. The term "pharmaceutically acceptable carrier" is intended to include any and all solvents, dispersion media, coatings, antibacterial and antifungal agents, isotonic and absorption delaying agents, to hosts. The term "carrier" refers to a diluent, adjuvant, excipient, or vehicle with which the pharmaceutical composition is administered. Such pharmaceutical carriers can be sterile liquids, such as water and oils, including those of petroleum, animal, vegetable or synthetic origin, such as peanut oil, soybean oil, mineral oil, sesame oil and the like. Water is a preferred carrier when the pharmaceutical composition is administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. The composition, if desired, can also contain minor amounts of wetting or emulsifying agents, or pH buffering agents. These compositions can take the form of solutions, suspensions, emulsion, tablets, pills, capsules, powders, sustained release formulations and the like. The composition can be formulated with traditional binders and carriers such as triglycerides depending on the method of administration. Particular formulations can include standard carriers such as pharmaceutical grades of mannitol, lactose, starch, magnesium stearate, sodium saccharine, cellulose, magnesium carbonate, etc. Examples of suitable pharmaceutical carriers are described in "Remington's Pharmaceutical Sciences" by E. W. Martin. The formulation should suit the mode of administration. The appropriate carrier is evident to those skilled in the art and will depend in large part upon the route of administration. Additional components that may be present in this invention are adjuvants, preservatives, surface active agents, chemical stabilizers, suspending or dispersing agents. Typically, stabilizers, adjuvants and preservatives are optimized to determine the best formulation for efficacy in the target subject A "variant" peptide refers herein to a peptide which differs in amino acid sequence from a "parent" vaccine peptide amino acid sequence by virtue of addition, deletion, and/or substitution of one or more amino acid residue(s) in the parent peptide sequence and retains at least one desired activity of the parent vaccine peptide. For example, the variant may comprise at least one, ex. from about one to about ten, and preferably from about two to about five, substitutions in one or more amino acid sequences of the peptide to be used as part of the vaccine of the present invention. Ordinarily, the variant will have an amino acid sequence having at least 50% amino acid sequence identity with the parent amino acid sequences, preferably at least 65%, more preferably at least 70%, more preferably at least 75%, more preferably at least 80%, more preferably at least 85%, more preferably at least 90%, and most preferably at least 95% sequence identity. Identity or homology with respect to this sequence is defined herein as the percentage of amino acid residues in the candidate sequence that are identical with the parent peptide residues, after aligning the sequences and introducing gaps, if necessary, to achieve the maximum percent sequence identity. None of N-terminal, C-terminal, or internal extensions, deletions, or insertions into the peptide sequence shall be construed as affecting sequence identity or homology. The variant retains the ability to elicit an immune response and preferably has desired activities which are superior to those of the parent peptide.

Variant peptides may be fully functional or may lack function in one or more activities. Fully functional variants typically contain only conservative variations or variations in non-critical residues or in non-critical regions. Functional variants can also contain substitution of similar amino acids that result in no change or an insignificant change in function. Alternatively, such substitutions may positively or negatively affect function to some degree. Non-functional variants typically contain one or more non-conservative amino acid substitutions, deletions, insertions, inversions, or truncation or a substitution, insertion, inversion, or deletion in a critical residue or critical region.

Moreover, polypeptides often contain amino acids other than the twenty "naturally occurring" amino acids. Further, many amino acids, including the terminal amino acids, may be modified by natural processes, such as processing and other post-translational modifications, or by chemical modification techniques well known in the art. Known modifications include, but are not limited to, acetylation, acylation, ADP-ribosylation, amidation, covalent attachment of flavin, covalent attachment of a heme moiety, covalent attachment of a nucleotide or nucleotide derivative, covalent attachment of a lipid or lipid derivative, covalent attachment of phosphotidylinositol, cross-linking, cyclization, disulfide bond formation, demethylation, formation of covalent crosslinks, formation of cystine, formation of pyroglutamate, formylation, gamma carboxylation, glycosylation, GPI anchor formation, hydroxylation, iodination, methylation, myristoylation, oxidation, proteolytic processing, phosphorylation, prenylation, racemization, selenoylation, sulfation, transfer-RNA mediated addition of amino acids to proteins such as arginylation, and ubiquitination. Such modifications are well known to those of skill in the art and have been described in great detail in the scientific literature. Several particularly common modifications, glycosylation, lipid attachment, sulfation, gamma-carboxylation of glutamic acid residues, hydroxylation and ADP ribosylation, for instance, are described in most basic texts, such as Proteins-Structure and Molecular Properties (2nd ed., T. E. Creighton, W.H. Freeman & Co., NY, 1993). Many detailed reviews are available on this subject, such as by Wold, Posttranslational Covalent Modification of proteins, 1-12 (Johnson, ed., Academic Press, N Y, 1983); Seifter et al. 182 Meth. Enzymol. 626-46 (1990); and Rattan et al. 663 Ann. NY Acad. Sci. 48-62 (1992).

A "variant" nucleic acid refers herein to a molecule which differs in sequence from a "parent" nucleic acid. Polynucleotide sequence divergence may result from mutational changes such as deletions, substitutions, or additions of one or more nucleotides. Each of these changes may occur alone or in combination, one or more times in a given sequence. A variant nucleic acid may contain nucleotide differences that result in conservative amino acid substitutions or the nucleotide sequence differences that result in differences in amino acids when translated. A variant nucleic acid may also be changes in regulatory elements.

Just as a polypeptide may contain conservative amino acid substitution(s), a polynucleotide thereof may contain nucleic acid sequences that code for conservative codon substitution(s). A codon substitution is considered conservative if, when expressed, it produces a conservative amino acid substitution, as described above. Degenerate codon substitution, which results in no amino acid substitution, is also useful in polynucleotides according to the present invention. Thus, for example, a polynucleotide encoding a selected polypeptide useful in an embodiment of the present invention may be mutated by degenerate codon substitution in order to approximate the codon usage frequency exhibited by an expression host cell to be transformed therewith, or to otherwise improve the expression thereof.

As used herein, "vector" means a construct, which is capable of delivering, and preferably expressing, one or more gene(s) or sequence(s) of interest in a host cell. Examples of vectors include, but are not limited to, viral vectors, naked DNA or RNA expression vectors, plasmid, cosmid or phage vectors, DNA or RNA expression vectors associated with cationic condensing agents, DNA or RNA expression vectors encapsulated in liposomes, and certain eukaryotic cells, such as producer cells. Vectors, as described herein, have expression control sequences meaning that a nucleic acid sequence that directs transcription of a nucleic acid. An expression control sequence can be a promoter, such as a constitutive or an inducible promoter, or an enhancer. The expression control sequence is 'operably linked' to the nucleic acid sequence to be transcribed. A nucleic acid is "operably linked" when it is placed into a functional relationship with another nucleic acid sequence. For example, DNA for a pre-sequence or secretory leader is operably linked to DNA for a polypeptide if it is expressed as a pre-protein that participates in the secretion of the polypeptide; a promoter or enhancer is operably linked to a coding sequence if it affects the transcription of the sequence; or a ribosome binding site is operably linked to a coding sequence if it is positioned so as to facilitate translation. Generally, "operably linked" means that the DNA sequences being linked are contiguous, and, in the case of a secretory leader, contiguous and in reading phase. However, enhancers do not have to be contiguous. Linking is accomplished by ligation at convenient restriction sites. If such sites do not exist, the synthetic oligonucleotide adaptors or linkers are used in accordance with conventional practice.

In accordance with the invention, recombinant viral vectors as described herein may enable protection of poultry against two or more different viral pathogens by providing recombinant viral vectors that express genes from such viral pathogens. In some embodiments, the recombinant viral vectors of the present invention may be provided to poultry in an immunogenic composition as described herein. Genes from any viral pathogen suitable for use with a recombinant viral vector as described herein may be used. For example, in some embodiments, the recombinant viral vector may express genes from Newcastle disease Virus (NDV), infectious bursal disease virus (IBDV), avian influenza virus (AIV), Chicken Anemia Virus (CAV), Infectious Bronchitis Virus (IBV), and Infectious Laryngotracheitis Virus (ILTV) or the like.

Viral antigens for expression in poultry by a recombinant viral vector of the present invention may be encoded by a viral gene, such as a viral gene as described herein. One of skill in the art will appreciate in this regard that it may not be required to incorporate the entirety of a particular gene in order to obtain a desired activity and/or function. Rather, a portion of such a gene may be used. It may be desirable to choose a particular portion of a desired gene that is specific to any given targeted virus or viruses. Optimization of a desired viral protein or sequence encoding such a protein regardless of the length of the protein may be readily carried out using the methodologies known in the art that are appropriate for use with the present invention. One of skill in the art will appreciate that modifications may be made to a gene or genes, or the proteins encoded thereby, to increase the activity of the viral protein when introduced into the subject. Modifications made to viral genes or proteins may increase or decrease the response in a host to a specific virus.

In certain embodiments, a recombinant Marek's disease virus or recombinant viral vector of the invention may have a transgene encoding an IBDV viral protein or gene product, such as an IBDV VP2 protein or gene product. In another embodiment, such a recombinant virus or viral vector may have a transgene encoding an NDV viral protein or gene product, such as an NDV F or HN protein or gene product. In another embodiment, such a recombinant virus or viral vector may have a transgene encoding an Avian Influenza Virus (AIV) viral protein or gene product, such as an AIV HA or N protein or gene product. In another embodiment, such a recombinant virus or viral vector may have a transgene encoding an Infectious Laryngotracheitis Virus (ILTV) viral protein or gene product, such as an ILTV gB or gC or gD or gE or gI, UL-32 protein or gene product. In another embodiment, such a recombinant virus or viral vector may have a transgene encoding an Infectious Bronchitis Virus (IBV) viral protein or gene product, such as IBV S1 or S2 protein or gene product. A transgene of the invention may have more than one gene, including a gene-fusion protein or gene product, such as an NDV F-HN fusion protein, chimera, or gene product. In some embodiments, the complete coding sequence of such a gene may be used such that a full-length or fully functional protein or polypeptide is produced. Alternatively, a portion or fragment of a viral protein or polypeptide may be sufficient to provide protection from or resistance to a particular virus or viruses. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

In certain embodiments, the method comprises providing a starting cell line which is an immortalized avian cell line. In certain embodiments, the immortalized avian cell line is selected from the group consisting of: JBJ-1; DF-1; LF-1; LMH; SL-29; DT-40; ESCDL-1; SC-1; SC-2; and ST-2. In particular examples, the immortalized avian cell line is a chicken fibroblast-like cell line. In specific examples, the immortalized avian cell line is JBJ-1.

In certain embodiments, the method comprises producing a modified cell line by genetically altering one or more genetic elements of the starting cell line. In particular embodiments, the genetic alteration can be within the coding portion of a target gene, while in other embodiments the genetic alteration can be to a portion of the genome that falls outside of the coding portion of the target gene but that otherwise impacts expression (e.g., genetic alteration to a promotor, enhancer, etc.).

In certain embodiments, the genetic alteration knocks-out (deletes) or knocks-down (disrupts) or increases (alters) expression of the target gene, thereby reducing expression, increasing expression or altering the functional activity of the gene product. Cells with such genetic alterations are referred to herein as a "deletion mutant," a "disruption mutant," or a "deletion/disruption mutant," which terms are generally used interchangeably throughout. Reduced or increased/altered expression can result from a number of different types of genetic alterations that are well known to a person of ordinary skill in the art. For example, reduced expression can result from reduced transcription of a functional form of the gene and/or from reduced translation of a functional form of the protein. For example, reduced expression can result from an alteration that produces an insertion or deletion ("indel") within the coding region of the target gene such that the protein that is ultimately transcribed is truncated (e.g., due to introduction of a stop codon) or sufficiently altered (e.g., due to elimination of an exon or change of multiple amino acid residues within the protein) so as to be nonfunctional or of reduced or enhanced/altered functionality, for example that of a suppressor/repressor element. In another example, reduced expression can result from an alteration that mutates a promoter or enhancer for the target gene such that transcription of the gene is reduced or eliminated. In a further example, reduced expression of a particular target gene can result from alteration of expression of another gene involved in expression of the target gene (e.g., an upstream signaling element).

The genetic alteration made in the cell line of the invention can provide the genetically modified cell line with a capability of supporting increased MDV viral replication or titer in a number of different ways that would be known to a person of ordinary skill in the art. In certain examples, the genetic alteration impacts one or more genes that are relevant to MDV entry into the cell and/or MDV survival and/or replication within the cell, and/or one or more genes that are relevant to cell survival during MDV infection. In other examples, the genetic alteration reduces expression of one or more genes involved in destruction or sequestration of the viral replication machinery. In additional examples, the genetic alteration reduces expression of one or more genes involved in destruction of viral particles. In other examples, the genetic alteration increases expression of one or more genes involved in replication of the virus. In still further examples, the genetic alteration reduces expression of one or more genes involved in apoptosis of infected cells. In additional examples, the genetic alteration involves a combination of genes involved in multiple aspects, e.g., reduction in expression of one or more genes involved in apoptosis and reduction in expression of one or more genes involved in destruction of viral particles.

The genetic alterations, as discussed herein, are performed by using the CRISPR/Cas9 system, which is well known by those of skill in the art. In brief, CRISPR (clustered regularly interspaced short palindromic repeats) is a family of DNA sequences found in the genomes of prokaryotic organisms such as bacteria and archaea. These sequences are derived from DNA fragments of bacteriophages that had previously infected the prokaryote. The sequences are used to detect and destroy DNA from similar bacteriophages during subsequent infections. Hence these sequences play a key role in the antiviral (i.e. anti-phage) defense system of prokaryotes. Cas9 (or "CRISPR-associated protein 9") is an enzyme that uses CRISPR sequences as a guide to recognize and cleave specific strands of DNA that are complementary to the CRISPR sequence. Cas9 enzymes together with CRISPR sequences form the basis of a technology known as CRISPR-Cas9 that can be used to edit genes. The Cas9 endonuclease is a four-component system that includes two small crRNA molecules and trans-activating CRISPR RNA (tracrRNA). The Cas9 endonuclease was engineered into a two-component system by fusing the two RNA molecules into a "single-guide RNA" that, when combined with Cas9, could find and cut the DNA target specified by the guide RNA. By manipulating the nucleotide sequence of the guide RNA, the artificial Cas9 system can be programmed to target any DNA sequence for cleavage. Cas9 was also shown capable of being reprogrammed to target a site of choosing by changing the sequence of its crRNA. These advances fueled efforts to edit genomes with the modified CRISPR-Cas9 system.

Specific gene targets for genetic alteration can be identified by through a variety of means that would be well known to a person of ordinary skill in the art, including review of literature of cellular genes involved in the relevant processes or bioinformatic analysis of cellular gene expression during MDV infection. In certain examples, specific gene targets for genetic alteration can be identified by comparing a gene expression profile in a cell line that is infected with MDV to a gene expression profile in uninfected cells. This can be done on the individual gene or pathway level, for example by PCR, qPCR, or real-time PCR analysis, or on a more global level for a large number of genes, for example using DNA microarrays or RNA-Seq. Such analyses will allow the identification of specific genes or pathways that are upregulated or downregulated in infected cells, thereby identifying candidate genes for genetic alteration. For example, if a proteolytic gene involved in antigen presentation is identified as upregulated during infection, this gene would be a candidate for reduction in expression. Similarly, if a gene involved in cellular apoptosis was found to be highly upregulated during infection, this gene would be a candidate for reduction in expression. Through such analyses, gene targets can be identified that can then be reduced or increased in expression to ascertain whether such alterations will have a positive impact on viral replication or viral titer. Following genetic alteration to reduce or increase gene expression or alter functional activity of various target proteins, the cells can be infected with MDV to ascertain whether the genetic alteration had a positive impact on viral replication or viral titer.

In one example, an RNA-Seq analysis was performed that identified 205 potential candidate genes that are upregulated during MDV infection of JBJ-1 cells (as compared to uninfected JBJ-1 cells). The genes that showed the largest expression change in that analysis were SLAMF8, HTR2A, BLEC2, CTSL2, COBLL1, STAT4, SEPP1, VTG1, AHSG, BRCA1, F13A1, GCGR, IL10, CDH5, IFNK, TP53I11, CTGF, and IRS1. In certain embodiments, the modified cell line contains a genetic alteration that results in reduced expression of one or more of these genes, for example, 1, 2, 3, 4, 5, 6, 7, 8, 9, or 10 of these genes. In particular embodiments, the modified cell line contains a genetic alteration that results in reduced expression of one or more of SLAMF8, HTR2A, BLEC2, CTSL2, COBLL1, and STAT4. In particular examples, the modified cell line contains a genetic alteration that results in reduced expression and/or function of SLAMF8. In other examples, the modified cell line contains a genetic alteration that results in reduced expression/function of HTR2A. In further examples, the modified cell line contains a genetic alteration that results in reduced expression of HTR2A and CTSL2, COBLL1, or STAT4. In additional examples, the modified cell line contains a genetic alteration that results in reduced expression of HTR2A, STAT4, and CTSL2 or COBLL1. In further examples, the modified cell line contains a genetic alteration that results in reduced expression of SLAMF8 and CTSL2, COBLL1, or STAT4. In additional examples, the modified cell line contains a genetic alteration that results in reduced expression of SLAMF8, STAT4, and CTSL2 or COBLL1.

In a typical diploid cell, the cell will possess two copies of each gene. Genetic alteration can impact both copies of a gene, producing a homozygous mutant, or only one copy, producing a heterozygous mutant. In certain examples, the modified cell is a heterozygous deletion/disruption mutant. In other examples, the modified cell is a homozygous deletion/disruption mutant.

In certain embodiments, MDV viral replication and/or titer in the modified cell line is increased by at least about 2-fold over that of the starting cell line. In other embodiments, MDV viral replication and/or titer in the modified cell line is increased by at least about 3-fold, about 4-fold about 5-fold, about 6-fold, about 7-fold, about 8-fold, about 9-fold, about 10-fold, about 11-fold, about 12-fold, about 13-fold, about 14-fold, about 15-fold, about 16-fold, about 17-fold, about 18-fold, about 19-fold, about 20-fold, about 25-fold, about 30-fold, about 35-fold, about 40-fold, about 45-fold, about 50-fold, about 60-fold, about 70-fold, about 80-fold, about 90-fold, about 100-fold, or more over that of the starting cell line. In other embodiments, MDV viral replication and/or titer in the modified cell line is increased by at least about 1 log over that of the starting cell line. In further embodiments, MDV viral replication and/or titer in the modified cell line is increased by 1-3 log over that of the starting cell line. In still further embodiments, MDV viral replication and/or titer in the modified cell line is increased by 1-2 log over that of the starting cell line.

In certain embodiments, MDV viral replication and/or titer in the modified cell line is within 1 log of, i.e., is not more than about 1 log less than, that obtained in primary CEF cells. In other embodiments, MDV viral replication and/or titer in the modified cell line is not more than about 20-fold less, about 10-fold1ess, about 9-fold less, about 8-fold less, about 7-fold less, about 6-fold less, about 5-fold less, about 4-fold less, about 3-fold less, or about 2-fold less than that obtained in primary CEF cells. In certain embodiments, MDV viral replication and/or titer is ascertained during active infection, for example at about 12, 24, 36, 48, 72, 96, or 120 hours after infection of the cells with MDV.

Viral replication and/or viral titer can be determined by any suitable method known in the art. In certain embodiments, viral replication is determined by analyzing the amount of viral DNA present in comparison to the amount of cellular genomic DNA present, for example by qPCR. For example, qPCR can be performed to compare the amount of viral DNA present to the amount of cellular ovotransferrin DNA present in a sample. By comparing the ratio of viral to cellular DNA during infection of the starting cell line to that of the modified cell line, one can ascertain whether the modified cell line is supporting increased viral replication/titer.

In other embodiments, viral titer is determined by serially diluting a viral preparation and infecting fresh permissive cells, such as CEFs, with these serial dilutions in replicates. Through the use of antibodies conjugated to a fluorescence molecule, such as FITC, and specific to the virus one can then count the number of foci, or areas around which a cell was infected. At a specific dilution, dependent upon the level of virus in the preparation, there are few enough foci, usually between 30 and 300, so that they can be individually counted. By averaging the countable foci and correcting for the dilution factor on can then determine the number of infectious viral units, or viral titer, in a specific preparation.

In other embodiments, the present application relates to a genetically modified cell line capable of supporting high-titer growth of MDV produced by the methods described herein. In further embodiments, the present application relates to a method of preparing or producing an MDV vaccine produced by inoculating or infecting genetically modified cells described herein with MDV, growing the MDV in those cells, and collecting the resulting cells or virus particles. In further embodiments, the present application relates to an MDV vaccine prepared using such a method.

The following examples are offered to illustrate, but not to limit, the claimed embodiments. It is to be understood that the examples and embodiments described herein are for illustrative purposes only, and persons skilled in the art will recognize various parameters that can be altered without departing from the spirit of the disclosure or the scope of the appended claims.

EXAMPLES

Example 1

Identification of Gene Targets for Enhancing MDV Replication/Titer in a Cell Line JBJ-1 cells, fibroblast-like continuous chicken cell line, which can be grown in flat bottom tissue culture flasks, roller bottles and on micro carrier, has previously been identified as capable of supporting growth of safe and efficacious MDV, including HVT. See Geerlings et al. 2008. However, the capacity for HVT viral production in the absence of adaptation is far below that of primary CEF cells. Thus, the inventors sought to enhance the ability of JBJ-1 cells to produce virus through gene editing. See, e.g., van der Sanden et al. 2016; Wu et al. 2017.

To identify potential candidate genes for targeted knockout, the inventors examined gene expression in MDV-infected and uninfected JBJ-1 cells at various time points using RNA-Seq. Briefly, JBJ-1 cells were seeded at ~90% confluence and infected with HVT-FC126 or not infected. Replicate samples of both infected and non-infected cells were collected at 4, 8, 24, and 36 hours post infection. RNA was isolated using standard methods. Quality control is implemented on the RNA to determine the concentration and RIN (RNA integrity number) before preparing the libraries for sequencing. An appropriate Total RNA Kit is used for library preparation of each sample. Final quality control on each library is done and samples are then normalized, pooled, and sequenced on an appropriate sequencer (i.e. NextSeq500) to generate approximately 40-80 million reads per sample. The reads were trimmed for ambiguous bases, low quality and adapter contamination and then mapped to Ensembl chicken genome (v.4.82) and HVT genome (NC_002641). Using the data obtained from the RNA-Seq analysis as the input, Ingenuity Pathway Analysis (IPA) software was used to identify genes that were highly induced or suppressed during MDV infection, as well as both up and down-stream regulators of those genes. From this analysis, 205 genes were identified that were potential targets which if altered may result in enhanced virus growth.

The CRISPR/Cas 9 method used is well known to those of skill in the art. A library containing 615 CRISPR single guide RNAs (sgRNAs) to target each of the identified 205 genes referred to above. For each gene, three separate sgRNAs were produced to ensure that the gene would be successfully disrupted during the CRISPR-Cas9 study. Cas9 was transfected into a JBJ-1 cell line and a JBJ-1 cell line that stably expresses Cas9 was selected ("Cas9-JBJ-1 cells"). Briefly, JBJ-1 cells were transduced with Edit-R lentiviral CAG-Blast-Cas9 nuclease particles according to manufacturer's recommendations (GE—Dharmacon) and then selected for the insert by growth in the presence of Blasticidin. The expression of CAS9 was confirmed by Western Blot or IFA using antibody 7A9 (Novus) and designated JBJ-1:pCAG CAS9. JBJ-1 were grown in DMEM with high glucose, 10% FBS, 0.02 mg/ml gentamicin, L-glutamine with or without 1.2 ug/ml blasticidin.

Using 24 well tissue culture plates, each of the 615 sgRNAs was transfected into Cas9-JBJ-1 cells. Briefly, JBJ-1: mCMV CAS9 were plated in 24 well plates at $3\times10^5$ cells per well approximately 18 hours prior to transfection. The tracrRNA and each crRNA were then duplexed in buffer by incubating at room temperature. The duplex was added to Dharmafect (Dharmacon) solution as per the manufacturer's instruction, added to media and then added to the cells for ~70 hours. After ~70 hours all wells were infected with HVT virus for ~46 hours, harvested, and assayed as described below.

The qPCR methodology was based on previously described primer and probe sets (Islam et al. 2004; Baigen et al. 2005). Briefly, the SORF1 gene (HVT-083/HVT-093) was used for quantification of the viral genome and the ovotransferrin (OVO or TF) gene was used for quantification of the chicken genome. The primers, probes, and standards for SORF1 and TF are listed in Table 1. The standard curves both used a synthesized gBlock from IDT of a region of the respective genes. Each duplex reaction was run in triplicate and the copy number of the SORF1 gene was divided by the copy number of the TF gene for copies of viral genome per chicken cell. In each experiment the viral copy number of the modified JBJ-1 cells was divided by the viral copy number of the wild type JBJ-1 cells to determine whether there was an increase in viral replication due to the gene disruption.

TABLE 1 qPCR Primer, Probe, and qBlock Sequences

| Name | Sequence | SEQ ID NO: |
|---|---|---|
| SORF1 F1 | GGCAGACACCGCGTTGTAT | 1 |
| SORF1 R1 | TGTCCACGCTCGAGACTATCC | 2 |
| SORF1 S1 | AACCCGGGCTTGTGGACGTCTTC | 3 |
| SORF1 STD | AAAAGCAACAGTACTAGTATTACGCCGGCCGCCATGGAAGAAACTAAGAGGCTGTAAATGACGGTCGGGCCTTCTTTAAAAGCGCTTGTATGTGTAGGGGCGGCCGTGAAGTTGCCCGGCGTGTCGGCAGACACCGCGTTGTATCCGAACCCGGGCTTGTGAACGTCTTCAAACACGTTCAGGATAGTCTCGAGCGTGGACAGATAAACGTACGTCCAAGCAAGCGGCCTTCCATTATAGAGGCCTACGATCACGTACAGTCCCGCGTCTGTCGGTTGGGCATTCGCCAACCTGAACGAGGGAACGTCCGATTCGAGGAAAGCCAGCTTCCCCTGGACGGATTCGTCTACGGACGTTTGGAATGTACACCCGCGGACGTCCACGCGGCAGCCGTCGGTACGCGCCGACGCCAACTGCATGACGTCCATATTTGCC | 4 |
| OVO (TF) F1 | CATTGCCACTGGGCTCTGT | 5 |
| OVO (TF) R1 | GCAATGGCAATAAACCTCCAA | 6 |
| OVO (TF) S | AGTCTGGAGAAGTCTGTGCAGCCTCCA | 7 |
| OVO (TF) STD | CTGGAGTGAGGGAAGAACCATGAGTTGCATCTCCACCAAAATACACAAATACACACACAAAAAACCCAGCCTGGGGCAGCATCGTAATGGATTTATTCCTGCTGAAGGCAGGAGAGACAAGCTGCACACTGCTCTTTGCAATGGCAATAAACCTCCAAGGATGGCGGCTGCACAGATTCTCCAGACTGACAGAGCCCAGTGGCAATGCTATAGCTATCTATAACGTGGCACCAACAGTAACTTTTGAATTTAAATCCAGCAGGTTTTCCTTCTCCAAGGAAGAATCCCAAAGAAGAATGGAGCCCACCTCAATCACGTCTTTTAGCAATTAGGATGGGTTCGTCCAGTAACACATCCAGTGGGTCAAATACGAACAG | 8 |

Through this screening, 18 genes were identified, listed in Table 2, that provided increased viral replication following CRISPR-Cas9 gene disruption.

TABLE 2

Genes Identified in CRISPR Matrix Screen

| Gene | Geometric Mean of Increase in Viral Load over WT in a Mixed Population | Biological Process | Function | Reason for Inclusion in Screen |
|---|---|---|---|---|
| SLAMF8 | 7.6 | Uncategorized | Lymphocyte activation on cell surface with Ig domain | Upregulated and Increases Antiviral Response- Overall Infection |
| HTR2A | 6.8 | Multicellular Organismal Process, Cellular Process | G-protein coupled serotonin receptor | Effect of Infection >4 log2 increase + significance <0.05 |
| BLEC2 | 3.2 | Uncategorized | Lectin like natural killer | Upregulated and Increases |

TABLE 2-continued

Genes Identified in CRISPR Matrix Screen

| Gene | Geometric Mean of Increase in Viral Load over WT in a Mixed Population | Biological Process | Function | Reason for Inclusion in Screen |
|---|---|---|---|---|
| | | | cell surface protein | Antiviral Response- Overall Infection |
| CTSL2 | 3.0 | Metabolic Process, Cellular Process | Proteolytic activity important for regulation of ECM and antigen presentation | Upregulated and increases interferon/ antiviral response |
| COBLL1 | 2.8 | Cellular Component Organization, Cellular Process | Binds to cadherin and actin network | Effect of Infection >4 log2 increase + significance <0.05 |
| STAT4 | 2.6 | Development, Process Biological Regulation, Response to Stimulus, Metabolic Process, Cellular Process | Signal transduction and activation of transcription for cytokines | Upstream regulator & is upregulated and upregulates apoptosis overall |
| SEPP1 | 2.6 | Metabolic Process | A heparin-binding protein thought to function as an antioxidant in the ECM by transporting/ binding selenium | Effect of Infection >4 log2 increase + significance <0.05 |
| VTG1 | 2.5 | Uncategorized | Major egg yolk protein precursors | Effect of Infection >4 log2 increase + significance <0.05 |
| AHSG | 2.3 | Multicellular Organismal Process, Development Process, Biological Regulation | Promotes endocytosis among many cell types and phagocytosis in immune cells | Effect of Infection >4 log2 increase |
| BRCA1 | 2.2 | Locomotion, Cellular Component Organization, Localization, Biological Regulation, Response to Stimulus, Metabolic Process, Cellular Process | DNA repair response, regulator of transcription, and the cell cycle | Upregulated and Upregulates Apoptosis- Overall Infection & is 1st Degree Regulator (Upstream) |
| F13A1 | 2.2 | Response to Stimulus, Metabolic Process | Catalytic cross-linking of fibrin chains stabilizing fibrin clots | Effect of Infection >4 log2 increase + significance <0.05 |
| GCGR | 2.0 | Uncategorized | G-protein coupled receptor for glucagon that | Down regulated |

TABLE 2-continued

Genes Identified in CRISPR Matrix Screen

| Gene | Geometric Mean of Increase in Viral Load over WT in a Mixed Population | Biological Process | Function | Reason for Inclusion in Screen |
|---|---|---|---|---|
| IL10 | 1.8 | Uncategorized | regulates blood glucose levels Inhibits the production of multiple cytokines and is a secondary regulator of the JAK-STAT pathway | |
| CDH5 | 1.4 | Multicellular Organismal Process, Development Process | A cadherin protein involved in cell cohesion and organizing intercellular junctions | 0 Degree regulator |
| IFNK | 1.4 | Uncategorized | Interferon kappa like defense against viral infections | Upregulated and Upregulates Apoptosis- Overall Infection |
| TP53I11 | 1.3 | Uncategorized | A response gene induced by activation of p53 thought to help induce apoptosis | Effect of Infection >4 log2 increase + significance <0.05 |
| CTGF | 1.3 | Biological Adhesion, Development Process, Response to Stimulus, Cellular Process | This protein is found in the ECM where it binds heparin upon release it can stimulate growth, wound repair, and healing | 0 Degree regulator |
| IRS1 | 1.1 | Biological Regulation, Response to Stimulus, Metabolic Process | Insulin receptor substrate 1 controls various intracellular pathways such as PI3K/Akt and Erk/MAP kinase | 0 Degree regulator |

These 18 genes are all candidates for gene deletion/disruption to produce an immortalized cell line capable of supporting increased MDV viral replication/titer. Of these 18 candidates, the 3 gene disruptions that produced the largest increase in viral replication were selected for further analysis.

Example 2

Generation of Gene Deletion/Disruption Mutants

The three genes that showed the largest impact on viral replication in the first example: SLAMF8, HTR2A, and BLEC2 genes were deleted/disrupted in normal JBJ-1 cells using ribonucleoprotein (RNP) complexes to further assess their impact on viral replication/titer. For each gene target, a sgRNA was generated, as shown in Table 3.

TABLE 3 gRNAs Use to Transfect JBJ-1 Cells (underlined portion is the gene-specific targeting sequence)

| Name | Sequence | SEQ ID NO: |
|---|---|---|
| BLEC2 | GUGGGCUCUUCCAGUUCCGUG UUUUAGAGCUAUGCUGUUUUG | 9 |
| HTR2A | GAUCCAAUGAGAUGGCACAGG UUUUAGAGCUAUGCUGUUUUG | 10 |
| SLAMF8 | AUGGCAUUCAGGGUGCUGGUG UUUUAGAGCUAUGCUGUUUUG | 11 |

Each single guide RNA (sgRNA) was complexed with the Cas9 protein to form an RNP. Each RNP complex was then transfected into JBJ-1 cells using commercial transfection reagents in a 24 well plate format and incubated for 72 hours. All populations were expanded into a 6 well plate and then a T25 flask to freeze back samples, test, and clone by limiting dilution. Cloning was performed by limiting dilution into ten 96 well plates per targeted gene. After 3-4 weeks of growth, positive wells were transferred into 24 well plates for further expansion and testing. Each well was tested by competitive binding PCR (cbPCR) for the presence of a homozygous deletion/disruption at the selected site. Positive clones were expanded and brought forward for further testing.

Competitive binding PCR (cbPCR) (Harayama and Riezman 2017) primers were created for each of the three genes and used to screen each clone for the presence of a deletion at the gene of interest. The primers used for the cbPCR studies are set forth in Tables 4-6 below.

TABLE 4 cbPCR primers for HTR2A

| Oligo | Sequence | Length | SEQ ID NO: |
|---|---|---|---|
| HTR2A F-Out | GCAGCCTGGGAGAA ACAAAACAAAAC | 26 nt | 12 |
| HTR2A R-Out | CTCTAAGCAAATTAC CCTAAGGAGAAGCTG | 30 nt | 13 |
| HTR2A F-In | CCTCCATCATGCACC TCTGTGC | 22 nt | 14 |

F-In to R-Out = 528 bp
(smaller PCR product)
F-Out to R-Out = 841 bp
(larger PCR product)

TABLE 5 cbPCR Primers for SLAMF8

| Oligo | Sequence | Length | SEQ ID NO: |
|---|---|---|---|
| SLAMF8 F-Out | TCCACCTGCACTT CCTTCTCAC | 22 nt | 15 |
| SLAMF8 R-Out | CACGCACACGGAC ACTCT | 21 nt | 16 |
| SLAMF8 F-In | CGTGACCATCCCC ACCAGC | 19 nt | 17 |

F-In to R-Out = 822 bp
(smaller PCR product)
F-Out to R-Out = 1112 bp
(larger PCR product)

TABLE 6 cbPCR Primers for BLEC2

| Oligo | Sequence | Length | SEQ ID NO: |
|---|---|---|---|
| BLEC2 F-Out | GGTGATGTCCCT GTGTCCATCT | 22 nt | 18 |
| BLEC2 R-Out | CAGAGCTGCTCA ATTTGGATTGGC | 24 nt | 19 |
| BLEC2 F-In | TGTGGGCTCTTC CAGTTCCG | 20 nt | 20 |
| BLEC2 R-In | GCTTTCTGGAAG TCCCACGGAAC | 23 nt | 21 |

F-In to R-Out = 611 bp
(smaller PCR product)
F-Out to R-Out = 950 bp
(larger PCR product)

Briefly, three primers were designed for each target gene: an outer forward primer, an outer reverse primer, and an inner primer of either forward or reverse orientation. PCR was performed using the three primers and then the resulting PCR products were analyzed by gel electrophoresis to observe. In designing the primers, the inner primer overlaps the target site of the gRNA such that if there was a disruption in that region (due to cleavage by the CRISPR-Cas9 complex) then the inner primer would be unable to bind, resulting in only the larger PCR product being amplified. Conversely, if the CRISPR-Cas9 complex did not cleave at the gRNA region, then the inner product would bind at its target site, resulting in a smaller PCR product being amplified. Therefore, if the smaller PCR product is observed on the gel (either only the smaller PCR product or both the small and large PCR products), then an undisrupted version of the target gene exists in the sample genotypes. Conversely, if only a single band of the larger PCR product is observed on the gel, then the sample is a homozygous population of the deletion/disruption mutant.

Eight 24-well plates (192 clones) of each gene deletion/disruption were analyzed by cbPCR. For the HTR2A deletion study, 12 clones (A1, A5, B2, B19, B24, C1, C5, E1, F14, F15, F23, and H12) were identified in the gel electrophoresis study as homozygous deletion/disruption mutants of HTR2A. After expansion, the analysis was repeated and 11 of those clones (A1, A5, B19, B24, C1, C5, E1, F14, F15, F23, and H12) were confirmed to be homozygous deletion/disruption mutants of HTR2A.

For SLAMF8, the initial analysis of eight 24-well plates did not identify any homozygous deletion/disruption mutants. As such, an additional eight 24-well plates were prepared and screened. Five clones (G10, G13, G15, G24, and I24) were identified in the gel electrophoresis study as homozygous deletion/disruption mutants of SLAMF8.

For BLEC2, the initial analysis of eight 24-well plates did not identify any homozygous deletion/disruption mutants. As such, an additional eight 24-well plates were prepared and screened, and again no homozygous deletion/disruption mutants of BLEC2 were identified. It is hypothesized that the homozygous BLEC2 disruption may be lethal to cells.

Example 3

Generation of Double Mutants of HTR2A Plus Another Candidate Gene

To assess whether simultaneous deletion/disruption of multiple candidate genes can further increase viral titer in the resulting modified cell line, double mutants were produced that had deletion/disruption of HTR2A plus an additional candidate gene. A deletion/disruption mutant of HTR2A produced in Example 2 (JBJ-1 HTR2A-mutant clone F14) was used as the starting cell line. The additional genes that were targeted for deletion/disruption were STAT4, CTSL2, COBLL1, and SLAMF8. Deletion/disruption mutants of these additional genes were produced and analyzed by cbPCR as described in Example 2 using the gRNA and primer sequences set forth in Tables 7-10.

TABLE 7 gRNA and cbPCR primer sequences for STAT4

| Oligo | Sequence | Length | SEQ ID NO: |
|---|---|---|---|
| STAT4 gRNA | AUGUAAUCCAUUAC CUGCACGUUUUAGA GCUAUGCUGUUUUG | | 22 |

TABLE 7-continued gRNA and cbPCR primer sequences for STAT4

| Oligo | Sequence | Length | SEQ ID NO: |
|---|---|---|---|
| STAT4 F-Out | TCTCTGTCAAACAC CAGCAATTCTGC | 26 nt | 23 |
| STAT4 R-Out | TGAAGATTAGCTG TGACATCCAAGTCA | 27 nt | 24 |
| STAT4 R-In | CATGGAGTAAATTA GAGAAATGTAATCC ATTACCTGCAC | 39 nt | 25 |

R-In to R Out = 729 bp
(smaller PCR product)
F-Out to R-Out = 910 bp
(larger PCR product)

TABLE 8 gRNA and cbPCR primer sequences for CTSL2

| Oligo | Sequence | Length | SEQ ID NO: |
|---|---|---|---|
| CTSL2 gRNA | UACCUUUGCAGUGUA UGGAUGUUUUAGAGC UAUGCUGUUUUG | 26 | |
| CTSL2 F-Out | GCTTTTCTCATGCTT AGACTGATGGCA | 27 nt | 27 |
| CTSL2 R-Out | CCTGTTTAACTTTTG GTAGATCATTAGAGG AACTTTAG | 38 nt | 28 |
| CTSL2 F-In | GGGGAATTGATTCAGA GGAATCCTATCCAT | 30 nt | 29 |

F-In to R Out = 630 bp
(smaller PCR product)
F-Out to R-Out = 904 bp
(larger PCR product)

TABLE 9 gRNA and cbPCR primer sequences for COBLL1

| Oligo | Sequence | Length | SEQ ID NO: |
|---|---|---|---|
| COBLL1 gRNA | AAUGGUGCUGGCUGGCAG GAGUUUUAGAGCUAUGCU GUUUUG | 30 | |
| COBLL1 F-Out | GCAGATGCAGCGAAGAGT TTCA | 22 nt | 31 |
| COBLL1 R-Out | CATACCAAACCATAAAGA ACACAAACACTCTG | 32 nt | 32 |
| COBLL1 F-In | ACTGCCAAGTTTTCCCTC CTGC | 22 nt | 33 |

F-In to R Out = 662 bp
(smaller PCR product)
F-Out to R-Out = 900bp
(larger PCR product)

TABLE 10 gRNA and cbPCR primer sequences for SLAMF8

| Oligo | Sequence | Length | SEQ ID NO: |
|---|---|---|---|
| SLAMF 8 gRNA | AUGGCAUUCAGG GUGCUGGUGUUU UAGAGCUAUGCU GUUUUG | | 11 |
| SLAMF 8 F-Out | TCCACCTGCACT TCCTTCTCAC | 22 nt | 15 |
| SLAMF 8 R-Out | CACGCACACGGA CACTCT | 21 nt | 16 |
| SLAMF 8 F-In | CGTGACCATCCCC ACCAGC | 19 nt | 17 |

F-In to R-Out = 822 bp
(smaller PCR product)
F-Out to R-Out = 1112 bp
(larger PCR product)

Between two and four 24-well plates (48-96 clones) of each double deletion/disruption were analyzed by cbPCR. Clones were identified in this analysis that possess double deletion/disruption of HTR2A in combination with STAT4, CTSL2 (e.g., clones 34 and 48), and COBLL1 (e.g., clones 35 and 47). No successful double deletion/disruption mutants of HTR2A in combination with SLAMF8 were identified leading the inventors to hypothesize that homozygous disruption of both of these genes may be lethal to cells.

Example 4

Testing of HTR2A Deletion Mutants by qPCR for MDV Viral Replication

To assess the deletion/disruption mutants' ability to support MDV replication, mutants were infected with MDV and analyzed using qPCR to determine the ratio of viral DNA to chicken genomic DNA in each sample, as described in Example 1. Infections were performed with HVT-FC126 virus in 24 well plates at two different MOIs (0.008 and 0.02) for each cell type. Samples were taken immediately after addition of virus to cells, then the remaining infection mix for each treatment was split equally between two 24 well plates. One plate was harvested at 48 hours and one at 72 hours. The results of this analysis are set forth in Table 11.

TABLE 11 qPCR Value of HVT Replication Over Time in JBJ-1 Cells and Select HTR2A- Mutants

|  |  | 0 Hours | | 48 Hours | | 72 Hours | |
| --- | --- | --- | --- | --- | --- | --- | --- |
| Cells | MOI | SORF1/ TF Ratio | Ratio to JBJ-1 | SORF1/ TF Ratio | Ratio to JBJ-1 | SORF1/ TF Ratio | Ratio to JBJ-1 |
| JBJ-1 | 0.008 | 5 | 1.00 | 5 | 1.00 | 6 | 1.00 |
|  | 0.02 | 18 | 1.00 | 19 | 1.00 | 17 | 1.00 |
| JBJ-1 HTR2A-A1 | 0.008 | 13 | 2.77 | 15 | 3.19 | 23 | 4.19 |
|  | 0.02 | 40 | 2.23 | 47 | 2.54 | 120 | 7.02 |
| JBJ-1 HTR2A-A5 | 0.008 | 9 | 1.96 | 7 | 1.47 | 14 | 2.54 |
|  | 0.02 | 25 | 1.38 | 20 | 1.06 | 28 | 1.61 |
| JBJ-1 HTR2A-B19 | 0.008 | 11 | 2.41 | 12 | 2.61 | 37 | 6.64 |
|  | 0.02 | 44 | 2.43 | 44 | 2.37 | 138 | 8.10 |
| JBJ-1 HTR2A-B24 | 0.008 | 7 | 1.55 | 10 | 2.16 | 13 | 2.40 |
|  | 0.02 | 21 | 1.46 | 31 | 1.65 | 48 | 2.80 |
| JBJ-1 HTR2A-C1 | 0.008 | 26 | 5.66 | 91 | 19.16 | 382 | 68.36 |
|  | 0.02 | 112 | 6.18 | 360 | 19.24 | 2710 | 158.46 |
| JBJ-1 HTR2A-C5 | 0.008 | 14 | 2.89 | 5 | 1.09 | 6 | 1.11 |
|  | 0.02 | 29 | 0.80 | 19 | 1.02 | 13 | 0.77 |
| JBJ-1 HTR2A-E1 | 0.008 | 14 | 3.09 | 20 | 1.08 | 27 | 4.78 |
|  | 0.02 | 39 | 1.14 | 53 | 11.05 | 57 | 3.33 |
| JBJ-1 HTR2A-F14 | 0.008 | 21 | 4.43 | 244 | 13.03 | 1083 | 193.85 |
|  | 0.02 | 76 | 4.18 | 648 | 34.65 | 2732 | 159.71 |
| JBJ-1 HTR2A-F15 | 0.008 | 6 | 1.30 | 7 | 1.42 | 9 | 1.66 |
|  | 0.02 | 18 | 1.00 | 18 | 0.97 | 23 | 1.36 |

HVT virus underwent little to no amplification in JBJ-1 wild type cells as evidenced by the consistent HVT/TF ratios across time points. Conversely, the HVT/TF ratio increased across time points for all HTRA2-mutants, and the HTR2A-mutants generally produced much higher ratios than were seen in the JBJ-1 wild type cells. Most of the HTR2A-mutant clones that were tested behaved similarly, with notable exceptions being clones C1 and F14, which produced much higher HVT/TF ratios than the other clones, and clones C5 and F15, which performed similarly to JBJ-1 wild type cells.

Example 5

Infection of HTR2A and SLAMF8 Mutants with HVT-ND-GFP Virus

To further characterize the ability of the single-gene deletion/disruption mutant cell lines to support replication of MDV, the cells were infected with the HVT-ND-GFP virus, a modified version of the HVT virus that possesses a gene from Newcastle Disease Virus and the gene for green fluorescent protein (GFP). This allows visualization of virus growth at specific time points, as well as making the cells/virus more amenable to titration. Primary CEF cells were used as a control. All cells were plated in T25 flasks at a density of $1.00 \times 10^6$ cells/cm$^2$ and infected with HVT-ND-GFP virus at a MOI of 0.008. GFP fluorescence was observed at 24, 48 and 72 hours post infection.

Figure 2:
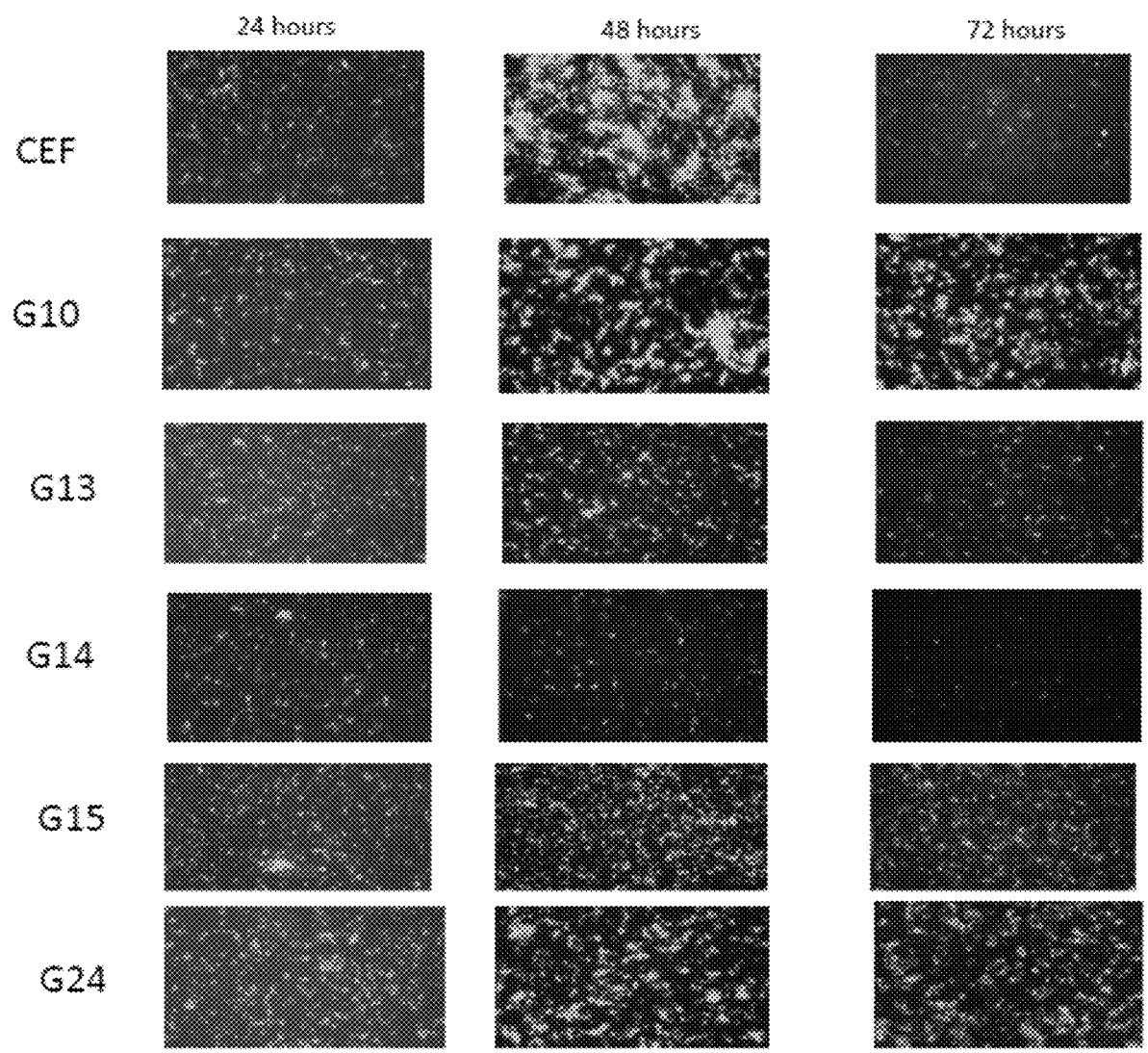
FIG. 2 presents fluorescent images of CEF and SLAMF8-modified JBJ-1 cells infected with HVT-ND-GFP at 24, 48, and 72 hours post-infection.

The resulting images are shown in FIG. 1 (HTR2A-clones) and FIG. 2 (SLAMF8-clones). As can be seen, the most active viral replication was observed in CEF cells at 48 hours post-infection. The deletion/disruption mutants also supported substantial viral replication.

For HTR2A-mutants, clone F14 at 72 hours showed the most replication, followed closely by clone C1 at 72 hours, while clone A1 supported less viral replication. This correlates well with the qPCR data, in which clone F14 provided the highest SORF1/TF ratio (1083 at 72 hours for an MOI of 0.008) and clone C1 provided the second highest SORF1/TF ratio (382 at 72 hours for an MOI of 0.008), with clone A1 providing a much lower ratio (23 at 72 hours for an MOI of 0.008).

For SLAMF8-mutants, clone G10 showed the most virus replication, followed closely by clone G24 hours and then clone G15. The other clones supported viral replication as well, but to a lesser extent than these clones.

Example 6

Infection of JBJ-1 and HTR2A-Mutant with Different HVT Viruses

To determine whether the increased viral replication in the deletion mutants is universal across multiple types of HVT virus, CEF, JBJ-1 wild type, and JBJ-1 HTR2A-mutant (clone F14) cells were infected with four distinct HVT viruses and then viral titer was determined. All cells were plated in T225 flasks at a density of $1.00 \times 10^6$ cells/cm$^2$ and infected with virus at a MOI of 0.008. After ~45 hours of incubation, cells were harvested at 1 ml/75 cm$^2$ and frozen back for titration using standard SOPs based upon the USDA CVB Testing Protocol SAM 407: Supplemental Assay Method for Titration of Marek's Serotype 3 (Herpesvirus of Turkeys Strain FC-126), Lyophilized. The results of this analysis are set forth in Table 12.

TABLE 12

Virus Yield of four Different HVT Viruses in CEF cells, JBJ-1 Wild Type, and JBJ1 HTR2A-Mutant Cells

| Virus | CEF Cells | JBJ-1 Cells | JBJ-1 HTR2A-F14 |
| --- | --- | --- | --- |
| HVT-FC126 | 1.96E+06 | 5.85E+03 | 1.22E+06 |
| HVT-ND | 1.29E+06 | 2.54E+04 | 1.15E+06 |
| HVT-IBD-ND | 2.12E+06 | 1.81E+04 | 6.89E+05 |
| HVT-IBD | 7.75E+05 | 1.50E+04 | 8.07E+05 |

All four viruses grew better in CEF cells than in JBJ-1 cells (1-3 logs higher). The HTR2A-mutant cell line provided greatly increased viral titer (1-2 logs higher) than was achieved with JBJ-1 wild type cells. In fact, HVT-IBD reached a higher titer in the HTR2A-cells than in CEF cells.

Example 7

Analysis of Fluorescence and Viral Titer in CEF, JBJ-1, and Deletion Mutant Cells Infected with HVT-ND-GFP To further characterize viral replication in the various mutant cell lines, cells were infected with HVT-ND-GFP virus then fluorescence was observed and viral titer determined. Primary CEF cells and wild type JBJ-1 cells were used as controls. All cells were plated in T75 flasks at a density of $1.02 \times 10^6$ cells/cm$^2$ and infected with virus at a MOI of 0.008. GFP fluorescence was observed and recorded at ~25 and 45 hours post-infection. At 45 hours post infections cells were also harvested at 1 ml/75 cm$^2$ and frozen back for titration using standard SOPs, as described above.

Figure 3:
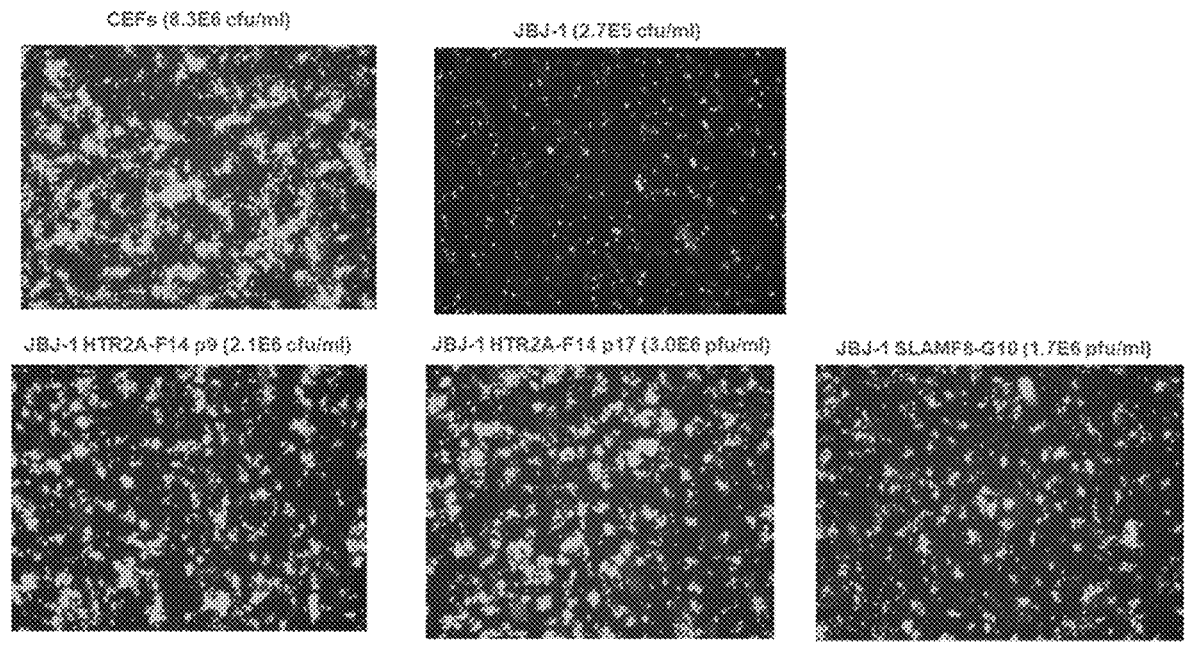
FIG. 3 presents fluorescent images of CEF cells, wild type JBJ-1 cells, and modified JBJ-1 cells infected with HVT-ND-GFP at 45 hours post-infection.

In a first study, JBJ-1 SLAMF8-mutant cells (clone G10) and JBJ-1 HTR2A-mutant cells (clone F14) were analyzed. For HTR2A-cell lines, both low passage (passage 9) and higher passage (passage 17) cultures of the F14 cell line clone were utilized to determine the effect of multiple passages on viral replication. The fluorescent images are shown in FIG. 3 and the results of the viral titer analysis are set forth in Table 13.

TABLE 13

Viral titer for various cell lines

| Cell Line | PFU/ml |
|---|---|
| CEF | 8.29E+06 |
| JBJ-1 wild type | 2.67E+05 |
| JBJ-1 HTR2A-clone F14 Low Pass | 2.09E+06 |
| JBJ-1 HTR2A-clone F14 High Pass | 3.04E+06 |
| HTR2A SLAMF8-clone G10 | 1.66E+06 |

According to both the GFP fluorescence and viral titer results, the HTR2A- and SLAMF8-mutants produced approximately 1 log higher virus titer than the wild type JBJ-1 cells and there was no difference between low pass or high pass HTR2A-cells. In all cases viral production within the JBJ-1 deletion mutants was lower than viral production within CEF cells but was within 1 log which is biologically important since the JBJ-1 cell line is transformed rather than a primary avian cell such as CEFs.

Figure 4:
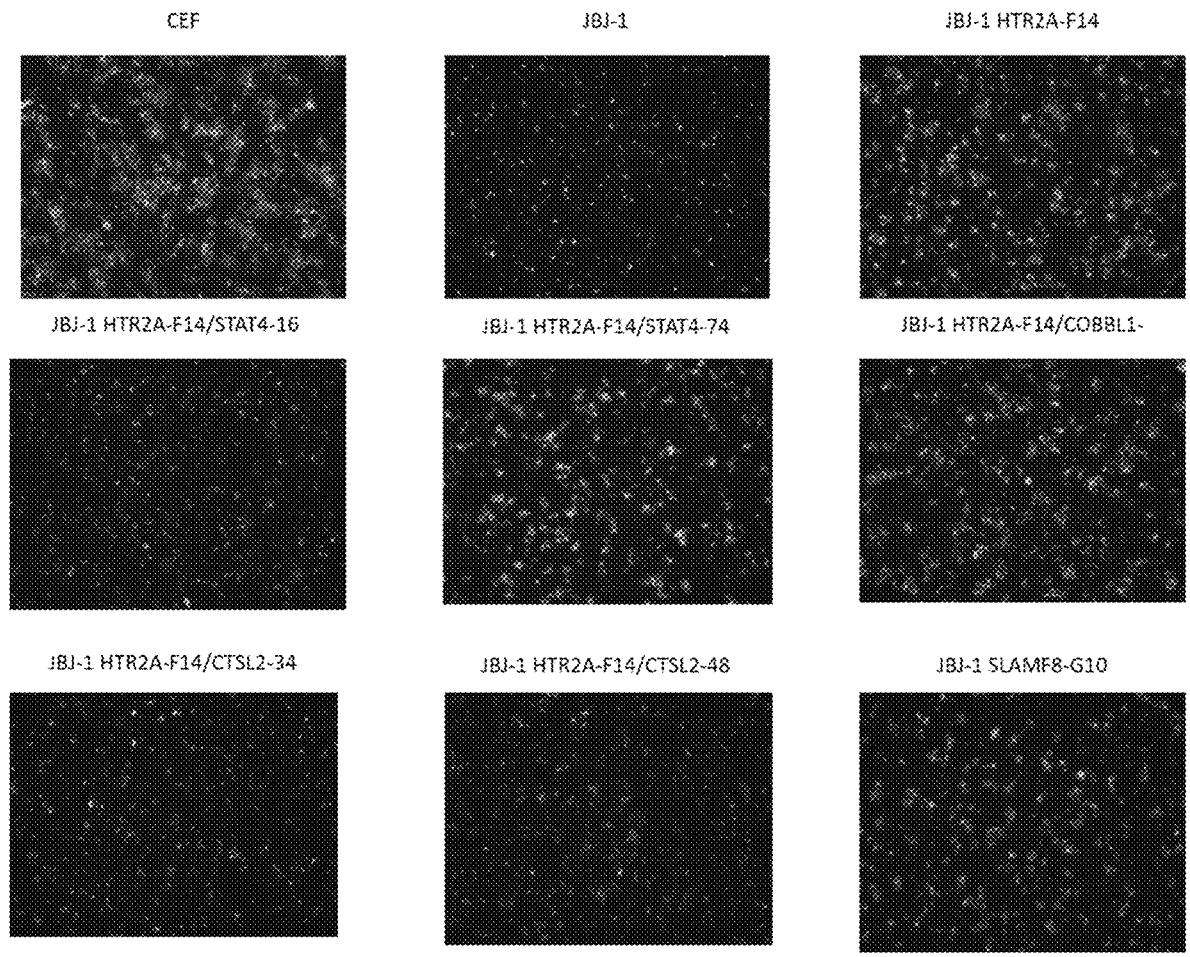
FIG. 4 presents fluorescent images of CEF cells, wild type JBJ-1 cells, and modified JBJ-1 cells infected with HVT-ND-GFP at 45 hours post-infection.

In a second study, the SLAMF8-mutant (clone G10) and HTR2A-mutant (clone F14) cells were compared with several double mutants: HTR2A-/STAT4-(clones 14 and 74), HTR2A-/CTSL2-(clones 34 and 48), and HTR2A-/COBLL1-(clone 2). The fluorescent images are shown in FIG. 4 and the results of the viral titer analysis are set forth in Table 14.

TABLE 14

Viral Titers for Various JBJ-1 Deletion Mutants Infected with HVT-ND-GFP

| Cell Line | PFU/ml |
|---|---|
| CEF | 5.41E+06 |
| JBJ-1 wild type | 2.44E+05 |
| HTR2A-clone F14 | 1.61E+06 |
| HTR2A-/STAT4-clone 16 | 1.87E+05 |
| HTR2A-/STAT4-clone 72 | 2.05E+06 |
| HTR2A-/COBBL1-clone 2 | 5.52E+05 |
| HTR2A-/CTSL-clone 34 | 2.73E+05 |
| HTR2A-/CTSL-clone 48 | 3.63E+05 |
| SLAMF8-clone G10 | 1.66E+06 |

Consistent with the other studies, according to both the GFP fluorescence and viral titer data, the HTR2A- and SLAMF8-mutants produced approximately 1 log higher virus titer than the wild type JBJ-1 cells and had a titer that was only slightly lower than was attained in primary CEF cells. Of the double deletion mutants, the HTR2A-/COBLL1- and HTR2A-/CTSL2-double mutants performed only negligibly better than JBJ-1 wild type cells. However, HTR2A-/STAT4-clone 72 performed as well as, or even slightly better than, each of the HTR2A- and SLAMF8- single mutants.

REFERENCES

Baigent, S. J., et al. (2005). "Absolute quantitation of Marek's disease virus genome copy number in chicken feather and lymphocyte samples using real-time PCR." J Virol Methods 123(1): 53-64.

Geerligs, H., et al. (2008). "Efficacy and safety of cell associated vaccines against Marek's disease virus grown in a continuous cell line from chickens." Vaccine 26(44): 5595-5600.

Harayama, T. and H. Riezman (2017). "Detection of genome-edited mutant clones by a simple competition-based PCR method." PLoS One 12(6): e0179165.

Islam, A., et al. (2004). "Differential amplification and quantitation of Marek's disease viruses using real-time polymerase chain reaction." J Virol Methods 119(2): 103-113.

Naito, Y., et al. (2015). "CRISPRdirect: software for designing CRISPR/Cas guide RNA with reduced off-target sites." Bioinformatics 31(7): 1120-1123.

van der Sanden, S. M., et al. (2016). "Engineering Enhanced Vaccine Cell Lines To Eradicate Vaccine-Preventable Diseases: the Polio End Game." J Virol 90(4): 1694-1704.

Wu, W., et al. (2017). "Development of improved vaccine cell lines against rotavirus." Sci Data 4: 170021.

We claim:

1. A genetically modified avian cell line capable of supporting high-titer growth of a Marek's Disease Virus (MDV), wherein the genetic modification comprises a genetic alteration of one or more of the following genes: SLAMF8, HTR2A, STAT4, CTSL2, and COBLL1; and wherein high-titer growth refers to at least a 2-fold higher yield in the viral titer as that achieved with the same MDV strain in a parent avian cell line.

2. The genetically modified cell line of claim 1, wherein said Marek's Disease Virus is selected from the group consisting of Marek's Disease Virus Serotype 1; Marek's Disease Virus Serotype 2; and Marek's Disease Virus Serotype 3.

3. The genetically modified cell line of claim 1, wherein said Marek's Disease Virus is a recombinant virus.

4. The genetically modified cell line of claim 3, wherein said recombinant Marek's Disease Virus comprises one or more heterologous antigens inserted into one or more locations in the MDV genome.

5. The genetically modified cell line of claim 4, wherein said one or more heterologous antigens comprise antigens from pathogenic avian viruses.

6. The genetically modified cell line of claim 5, wherein said pathogenic avian viruses are selected from the group consisting of: Infectious Bursal Disease Virus; Infectious Bronchitis Virus; Infectious Laryngotracheitis Virus; Newcastle Disease Virus; Chicken Anemia Virus and Avian Influenza Virus.

7. A method of producing a genetically modified cell line capable of supporting high-titer growth of Marek's Disease Virus (MDV), the method comprising: providing a starting cell line, wherein said starting cell line is an immortalized avian cell line, and producing a genetically modified cell line by genetically altering the starting cell line to reduce expression thereby altering functional activity of the product of one or both of gene HTR2A and SLAMF8, wherein the genetically modified cell line is capable of supporting increased MDV viral titer as compared to the starting cell line when infected with the same MDV strain.

8. The method of claim 7, wherein said starting cell line is selected from the group consisting of: JBJ-1, DF-1; LF-1; LMH; SL-29; DT-40; ESCDL-1; SC-1; SC-2; and ST-2.

9. The method of claim 8, wherein said starting cell line comprises JBJ-1.

10. The method of claim 7, wherein the genetic alteration comprises altering the genome using TALENs, ZFNs, CRISPR-Cas9, or alternative CRISPR-Cas enzymes.

11. The method of claim 10, wherein the genetic alteration comprises altering the genome using CRISPR-Cas9.

12. The method of claim 7, wherein the genetically modified cell line supports an MDV viral titer at least 10-fold higher than the starting cell line when infected with the same MDV strain.

13. The method of claim 7, wherein the genetically modified cell line supports an MDV viral titer at least 50-fold higher than the starting cell line when infected with the same MDV strain.

14. The method of claim 7, wherein the genetically modified cell line supports an MDV viral titer that is within 2-fold of the viral titer achieved with the same MDV strain on primary chicken embryo fibroblast (CEF) cells.

15. The method of claim 7, wherein the genetically modified cell line comprises a genetic alteration that alters the functional activity of the product of the HTR2A gene.

16. The method of claim 15, wherein the genetically modified cell line further comprises a genetic alteration that alters functional activity of the product of one or more additional genes selected from the group consisting of STAT4, COBBL2, and CTSL.

17. The method of claim 16, wherein said additional gene comprises STAT4.

18. A genetically modified cell line capable of supporting high-titer growth of Marek's Disease Virus (MDV), produced by the method of claim 7.

19. The genetically modified cell line of claim 18, wherein the MDV comprises nucleic acids that encode heterologous antigens inserted into one or more locations in the MDV genome.

20. The genetically modified cell line of either claim 18 or claim 19, wherein the heterologous antigens are from poultry pathogens selected from the group consisting of: Infectious Bursal Disease Virus; Infectious Bronchitis Virus; Newcastle Disease Virus; Infectious Laryngotracheitis Virus; Avian Influenza Virus; and Chicken Anemia Virus.

21. A method of preparing an MDV vaccine, the method comprising: preparing a genetically modified cell line by the method of claim 7 and growing said MDV in said genetically modified cell line.

22. The genetically modified cell line of claim 1, wherein the high-titer growth refers to at least a 10-fold higher yield in the viral titer as that achieved with the same MDV strain in a parent avian cell line.

23. The genetically modified cell line of claim 1, wherein the high-titer growth refers to at least a 50-fold higher yield in the viral titer as that achieved with the same MDV strain in a parent avian cell line.

* * * * *